United States Patent
Yang

(10) Patent No.: US 12,432,445 B2
(45) Date of Patent: Sep. 30, 2025

(54) SHOOTING METHOD AND ELECTRONIC DEVICE BASED ON QUANTITY OF SHOT OBJECTS AND HOLDING STATE

(71) Applicant: Huawei Technologies Co., Ltd., Shenzhen (CN)

(72) Inventor: Banghui Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 18/029,144

(22) PCT Filed: Aug. 31, 2021

(86) PCT No.: PCT/CN2021/115744
§ 371 (c)(1),
(2) Date: Mar. 29, 2023

(87) PCT Pub. No.: WO2022/068505
PCT Pub. Date: Apr. 7, 2022

(65) Prior Publication Data
US 2023/0370718 A1    Nov. 16, 2023

(30) Foreign Application Priority Data
Sep. 30, 2020  (CN) .......................... 202011061501.2

(51) Int. Cl.
*H04N 5/335*     (2011.01)
*H04N 23/61*     (2023.01)
(Continued)

(52) U.S. Cl.
CPC ........... *H04N 23/667* (2023.01); *H04N 23/61* (2023.01); *H04N 23/632* (2023.01)

(58) Field of Classification Search
CPC .................................................. H04N 23/632
See application file for complete search history.

(56) References Cited

U.S. PATENT DOCUMENTS

| | | | |
|---|---|---|---|
| 9,491,403 B2 * | 11/2016 | Atkinson | H04N 21/4788 |
| 2009/0256925 A1 * | 10/2009 | Yoshizumi | H04N 23/64 |
| | | | 348/222.1 |

(Continued)

FOREIGN PATENT DOCUMENTS

| | | |
|---|---|---|
| CN | 104469119 A | 3/2015 |
| CN | 107465856 A | 12/2017 |

(Continued)

*Primary Examiner* — Gary C Vieaux
(74) *Attorney, Agent, or Firm* — Slater Matsil, LLP

(57) ABSTRACT

Embodiments of this application disclose a shooting method and an electronic device, and relate to the field of image processing, to obtain relatively good image quality without manual adjustment performed by a user. A specific solution is as follows: When shooting is started, the electronic device determines a quantity of shot objects and/or a holding state, where the holding state includes a first state in which a display screen is a landscape screen or a second state in which the display screen is a portrait screen. The electronic device sets a shooting parameter based on the determined quantity of the shot objects and/or the holding state, where the shooting parameter is a parameter used when the electronic device performs shooting. The electronic device obtains a first preview image based on the shooting parameter, and displays the first preview image on a display screen.

20 Claims, 17 Drawing Sheets

(51) Int. Cl.
    *H04N 23/63*     (2023.01)
    *H04N 23/667*     (2023.01)

(56) References Cited

U.S. PATENT DOCUMENTS

| | | | | |
|---|---|---|---|---|
| 2014/0240544 | A1* | 8/2014 | Kim | H04N 23/61 |
| | | | | 348/231.99 |
| 2016/0219217 | A1* | 7/2016 | Williams | H04N 23/80 |
| 2020/0177797 | A1* | 6/2020 | Liu | H04N 23/63 |
| 2023/0412656 | A1* | 12/2023 | Yu | H04N 7/15 |

FOREIGN PATENT DOCUMENTS

| | | |
|---|---|---|
| CN | 108605087 A | 9/2018 |
| CN | 110225240 A | 9/2019 |
| CN | 111050071 A | 4/2020 |
| CN | 111385415 A | 7/2020 |
| CN | 112422814 A | 2/2021 |

* cited by examiner (a)

(b)

SHOOTING METHOD AND ELECTRONIC DEVICE BASED ON QUANTITY OF SHOT OBJECTS AND HOLDING STATE

CROSS-REFERENCE TO RELATED APPLICATIONS

This application is a National Stage of International Application No. PCT/CN2021/115744, filed on Aug. 31, 2021, which claims priority to Chinese Patent Application No. 202011061501.2, filed on Sep. 30, 2020. Both of the aforementioned applications are hereby incorporated by reference in their entireties.

TECHNICAL FIELD

Embodiments of this application relate to the field of image processing, and in particular, to a shooting method and an electronic device.

BACKGROUND

Currently, most electronic devices have a shooting function. When a user uses an electronic device (for example, a mobile phone) to perform shooting, a shooting field of view (Field of View, FOV) of a camera on the mobile phone may be manually adjusted, to adjust a range of a shooting scene. The user may further set another parameter of the camera, for example, an output image ratio, to adjust a distribution ratio of the shooting scene on a photo. It may be understood that the user may adjust a shooting effect through the foregoing operation and another operation.

However, most users do not have a complete professional shooting skill. Therefore, they may not be able to adjust the shooting effect to a relatively proper position through active control. Therefore, image quality of shooting is affected.

SUMMARY

Embodiments of this application provide a shooting method and an electronic device. Automatic adjustment of a shooting parameter such as an FOV and/or an output image ratio can be adaptively performed based on a shot object and a holding manner of a user, so that good image quality can be obtained without manual adjustment performed by the user.

To achieve the foregoing objective, the following technical solutions are used in embodiments of this application.

According to a first aspect, a shooting method is provided. The method is applied to an electronic device having a shooting function, and the electronic device is provided with a display screen. The method includes: When shooting is started, the electronic device determines a quantity of shot objects and/or a holding state, where the holding state includes a first state in which the display screen is a landscape screen or a second state in which the display screen is a portrait screen. The electronic device sets a shooting parameter based on the determined quantity of the shot objects and/or the holding state, where the shooting parameter is a parameter used when the electronic device performs shooting. The electronic device obtains a first preview image based on the shooting parameter, and displays the first preview image on the display screen.

Based on this solution, the electronic device may adaptively adjust the shooting parameter when the shooting is started. In this way, the electronic device can actively provide, for the user, a reference for a shooting parameter corresponding to a current shooting scene, thereby improving quality. In some implementation scenarios in this example, the electronic device may adjust the shooting parameter based on the quantity of the shot objects, for example, a quantity of faces in a portrait shooting process. In some other implementation scenarios of this example, the electronic device may adjust the shooting parameter based on a current holding state, for example, a landscape screen state or a portrait screen state. In some other implementation scenarios, the electronic device may further adaptively adjust a current shooting parameter with reference to factors (for example, the quantity of faces and the holding state) in the foregoing two examples and another scenario-related factor, to improve image quality.

In a possible design, before the electronic device determines the quantity of the shot objects and/or the holding state, the method further includes: The electronic device obtains a second preview image based on a current shooting parameter. That the electronic device determines a quantity of shot objects and/or a holding state includes: The electronic device determines the quantity of the shot objects and/or the holding state based on the second preview image. Based on this solution, a specific example of a method for determining the quantity of the shot objects and/or the holding state is provided. In this example, the electronic device may obtain the second preview image based on the current shooting parameter. The second preview image may include all or most objects in a scene that the user wants to shoot. Therefore, the electronic device can accurately determine the quantity of the shot objects and/or the holding state based on the second preview image. It should be noted that, in this example, the holding state is determined based on the second preview image. In some other examples, the electronic device may directly determine the holding state based on a sensor disposed in the electronic device, for example, a gravity sensor that the user can use to detect whether the electronic device is in the portrait screen state or the landscape screen state.

In a possible design, the electronic device determines the holding state, and the shooting parameter includes an output image ratio. That the electronic device sets a shooting parameter includes: When the holding state is the first state, the electronic device sets the output image ratio to a first output image ratio, and when the holding state is the second state, the electronic device sets the output image ratio to a second output image ratio. Based on this solution, a specific solution for adjusting the shooting parameter based on the holding state is proposed. In this example, the electronic device may determine, based on the holding state that is either the landscape screen or the portrait screen, whether the output image ratio needs to be adjusted. For example, when the holding state is the landscape screen state, the output image ratio is adjusted to the first output image ratio, so that the preview image and/or a final photo can fit with the landscape screen. For another example, when the holding state is the portrait screen state, the output image ratio is adjusted to the second output image ratio, so that the preview image and/or a final photo can fit with the portrait screen.

In a possible design, the first output image ratio is 16:9, and the second output image ratio is 4:3. Based on this solution, a specific solution for adjusting the output image ratio is provided. This solution can enable the electronic device to adjust the output image ratio to a more appropriate state based on the holding state, so that image quality of the preview image and the photo can be improved.

In a possible design, the electronic device further determines the quantity of the shot objects, and the shooting parameter further includes a field of view FOV. That the electronic device sets a shooting parameter includes: The electronic device determines that the quantity of the shot objects is greater than a first threshold, and sets the FOV to a first FOV. The electronic device determines that the quantity of the shot objects is less than the first threshold and that the holding state is the first state, and sets the FOV to a second FOV. The electronic device determines that the quantity of the shot objects is less than the first threshold and that the holding state is a second state, and sets the FOV to a third FOV. The first FOV is greater than the second FOV, and the second FOV is greater than the third FOV. Based on this solution, a specific solution for adjusting the shooting parameter based on the quantity of the shot objects and the holding state is proposed. In this example, the electronic device may determine, based on the quantity of the shot objects and the holding state that is either the landscape screen state or the portrait screen state, whether the FOV needs to be adjusted. For example, when the quantity of the shot objects is large (for example, greater than the first threshold), the FOV may be adjusted to a relatively large first FOV, so that a distribution ratio of the shot objects in a framing range can be optimized when all shot objects are covered in the framing range. Similarly, when the quantity of the shot objects is small, (for example, less than the first threshold), the FOV may be adjusted with reference to the holding state. In this way, the FOV can be adaptively adjusted based on the quantity of the shot objects and the holding state, thereby improving the image quality.

In a possible design, the first FOV is 100 degrees, the second FOV is 90 degrees, and the third FOV is 78 degrees. Based on this solution, a specific solution for adjusting the output image ratio is provided. This solution can enable the electronic device, based on the quantity of the shot objects or based on the quantity of the shot objects and the holding state, to adjust the FOV to a more appropriate state, so that image quality of the preview image and the photo can be improved. It should be understood that, in the foregoing examples, solutions for separately adjusting the FOV or the output image ratio are provided. In some other examples of this application, the electronic device may further adjust the FOV, the output image ratio, and another shooting parameter at the same time, to obtain better image quality. A specific process is similar. Details are not described herein again.

In a possible design, the electronic device is provided with a first camera module and a second camera module, and a maximum FOV of the second camera module is greater than a maximum FOV of the first camera module. When the electronic device sets the FOV to the first FOV, and the first FOV is greater than the maximum FOV of the first camera module, the electronic device performs shooting by using the second camera module. Alternatively, when the electronic device sets the FOV to the second FOV, and the second FOV is greater than the maximum FOV of the first camera module, the electronic device performs shooting by using the second camera module. Based on this solution, a specific implementation method for adjusting the FOV by an electronic device is provided. In this example, the electronic device may, based on a size of the FOV that needs to be set and a maximum FOV that can be provided by each camera module, flexibly select a corresponding camera module, to adjust the FOV. For example, when the FOV that needs to be set is large, the electronic device may perform framing and shooting with a wide-angle lens. For another example, when a currently required FOV is relatively small, the electronic device may use a common lens to perform framing and shooting, or the electronic device may use a wide-angle lens to perform framing and crop a relatively large FOV, to obtain an image in the required FOV.

In a possible design, before the electronic device obtains the first preview image based on the shooting parameter, the method further includes: The electronic device displays the second preview image obtained based on the current shooting parameter on the display screen. That the electronic device displays the first preview image on the display screen includes: The electronic device controls the display screen to switch from displaying the second preview image to displaying the first preview image. Based on this solution, a solution for display on the display screen of the electronic device is provided. In this example, the electronic device may first display the preview image obtained based on the current shooting parameter on the display screen, so that the user can see the preview image on the display screen before the shooting parameter is adjusted. After adjusting the shooting parameter, the electronic device can display a preview image obtained based on a new shooting parameter on the display screen. In this way, the user can intuitively view, on the display screen, the preview image obtained after the shooting parameter is adjusted. In this way, the user can intuitively determine a result of adjusting the shooting parameter, so that the user can determine, based on an intuitive preview image, whether to adjust a corresponding shooting parameter, thereby further improving the image quality.

In a possible design, before shooting is started, the method further includes: The electronic device receives a first operation of the user, where the first operation is used to indicate the electronic device to start shooting. Based on this solution, a trigger mechanism for starting shooting is provided. In this example, the electronic device may start shooting based on the first operation input by the user. The first operation may be an operation performed by the user on an icon of an APP having a shooting function on the display screen of the electronic device, for example, touching the icon or taping the icon.

In a possible design, the method further includes: The electronic device receives a second operation of the user, where the second operation is used to indicate the electronic device to photograph a currently displayed preview image; and in response to the second operation, the electronic device performs image processing on the preview image based on a set shooting image, to obtain a corresponding photo and store the photo. Based on this solution, a solution for obtaining a photo by the electronic device is provided. In this example, the user may input, on the display screen of the electronic device, an operation such as a touch or a tap on a corresponding button, such as a shooting button, to input a shooting instruction to the electronic device. In response to the instruction, the electronic device may perform image processing on the preview image based on a currently adjusted shooting parameter, to obtain a photo with high image quality.

According to a second aspect, a shooting apparatus is provided. The apparatus includes a determining unit, a setting unit, an obtaining unit, and a display unit. The determining unit is configured to determine a quantity of shot objects and/or a holding state when shooting is started, where the holding state includes a first state in which a display screen is a landscape screen or a second state in which a display screen is a portrait screen. The setting unit is configured to set a shooting parameter based on the determined quantity of the shot objects and/or the holding state, where the shooting parameter is a parameter used when the electronic device performs shooting. The obtaining unit is configured to obtain a first preview image based on the shooting parameter. The display unit is configured to display the first preview image.

In a possible design, the obtaining unit is further configured to obtain a second preview image based on a current shooting parameter. The determining unit is configured to determine the quantity of the shot objects and/or the holding state based on the second preview image.

In a possible design, when the holding state is the first state, the setting unit is configured to set an output image ratio to a first output image ratio. When the holding state is the second state, the setting unit is configured to set the output image ratio to a second output image ratio.

In a possible design, the first output image ratio is 16:9, and the second output image ratio is 4:3.

In a possible design, the determining unit is configured to determine that the quantity of the shot objects is greater than a first threshold, and the setting unit is configured to set an FOV to a first FOV. The determining unit is configured to determine that the quantity of the shot objects is less than the first threshold, and that the holding state is the first state. The setting unit is configured to set the FOV to a second FOV. The determining unit is configured to determine that the quantity of the shot objects is less than the first threshold, and that the holding state is the second state. The setting unit is configured to set the FOV to a third FOV. The first FOV is greater than the second FOV, and the second FOV is greater than the third FOV.

In a possible design, the first FOV is 100 degrees, the second FOV is 90 degrees, and the third FOV is 78 degrees.

In a possible design, the electronic device is provided with a first camera module and a second camera module, and a maximum FOV of the second camera module is greater than a maximum FOV of the first camera module. When the electronic device sets the FOV to the first FOV, and the first FOV is greater than the maximum FOV of the first camera module, the electronic device performs shooting by using the second camera module. Alternatively, when the electronic device sets the FOV to the second FOV, and the second FOV is greater than the maximum FOV of the first camera module, the electronic device performs shooting by using the second camera module.

In a possible design, before the electronic device obtains the first preview image based on the shooting parameter, the display unit is configured to display the second preview image obtained based on the current shooting parameter. The display unit is further configured to switch from displaying the second preview image to displaying the first preview image.

In a possible design, the apparatus further includes a receiving unit, configured to receive a first operation of the user before shooting is started, where the first operation is used to indicate the electronic device to start shooting.

In a possible design, the receiving unit is configured to receive a second operation of the user, where the second operation is used to indicate the electronic device to photograph a currently displayed preview image; and in response to the second operation, the setting unit is configured for the electronic device to perform image processing on the preview image based on a set shooting image, to obtain a corresponding photo and store the photo.

According to a third aspect, an electronic device is provided. The electronic device has a shooting function. The electronic device includes one or more processors and one or more memories. The one or more memories are coupled to the one or more processors, and the one or more memories store computer instructions. When the one or more processors execute the computer instructions, the electronic device is enabled to perform the shooting method according to any one of the first aspect and the possible designs.

According to a fourth aspect, a chip system is provided. The chip system includes an interface circuit and a processor. The interface circuit and the processor are interconnected through a line. The interface circuit is configured to receive a signal from a memory, and send a signal to the processor. The signal includes a computer instruction stored in the memory. When the processor executes the computer instruction, the chip system performs the shooting method according to any one of the first aspect and the possible designs.

According to a fifth aspect, a computer-readable storage medium is provided. The computer-readable storage medium includes computer instructions. When the computer instructions are run, the shooting method according to any one of the first aspect and the possible designs is performed.

According to a sixth aspect, a computer program product is provided. The computer program product includes instructions. When the computer program product runs on a computer, the computer may perform, based on the instructions, the shooting method in any one of the first aspect and the possible designs.

It should be understood that technical features of the technical solutions provided in the second aspect, the third aspect, the fourth aspect, the fifth aspect, and the sixth aspect may all correspond to the shooting method provided in the first aspect and the possible designs of the first aspect. Therefore, beneficial effects that can be achieved are similar, and details are not described herein again.

DETAILED DESCRIPTION OF ILLUSTRATIVE EMBODIMENTS

Most existing electronic devices are provided with a camera for photographing. For example, an electronic device is a mobile phone. As shown in (a) in FIG. 1, a "Camera" icon 101 may be displayed in an interface of the mobile phone. When shooting needs to be performed, the user may tap the icon 101 to control the mobile phone to enter a shooting interface. A schematic diagram of the shooting interface is shown in (b) in FIG. 1. As shown in (b) in FIG. 1, the shooting interface may include a preview box 102 and a shooting button 103. The user may view, through the preview box 102, a current framing situation of the camera of mobile phone. For example, the mobile phone may process, based on a current shooting-related setting (for example, an FOV size or an output image ratio), an optical signal obtained from the camera, and display a processed image in the preview box 102. The user may enter an operation (for example, a tap operation or a touch operation) on the shooting button 103, to control the mobile phone to perform shooting. After receiving the operation performed by the user on the shooting button 103, the mobile phone may perform image processing on a current preview image, to obtain a corresponding picture and store the picture in a gallery. In this way, the user completes one shot by using the mobile phone.

It should be noted that a plurality of different parameters in a shooting process may affect image quality. For example, a size of an FOV directly affects a range in which the camera of the mobile phone obtains the optical signal. It may be understood that, if the FOV is inappropriate, for example, the FOV is excessively small, the mobile phone cannot obtain the optical signals corresponding to all objects that the user wants to shoot. Consequently, not all objects that the user wants to shoot can be included during image processing of the mobile phone. This results in an image failure. For another example, the output image ratio directly affects image composition during image processing of the mobile phone. If the output image ratio is inappropriate, in a photo obtained through image processing, a position of an object that the user wants to shoot is inappropriate in the picture, thereby affecting the image quality, and even causing the image failure. It may be understood there may be other parameters, for example, white balance, and an exposure time. Whether setting of these shooting parameters is appropriate or not affects the image quality directly or indirectly.

Figure 1:
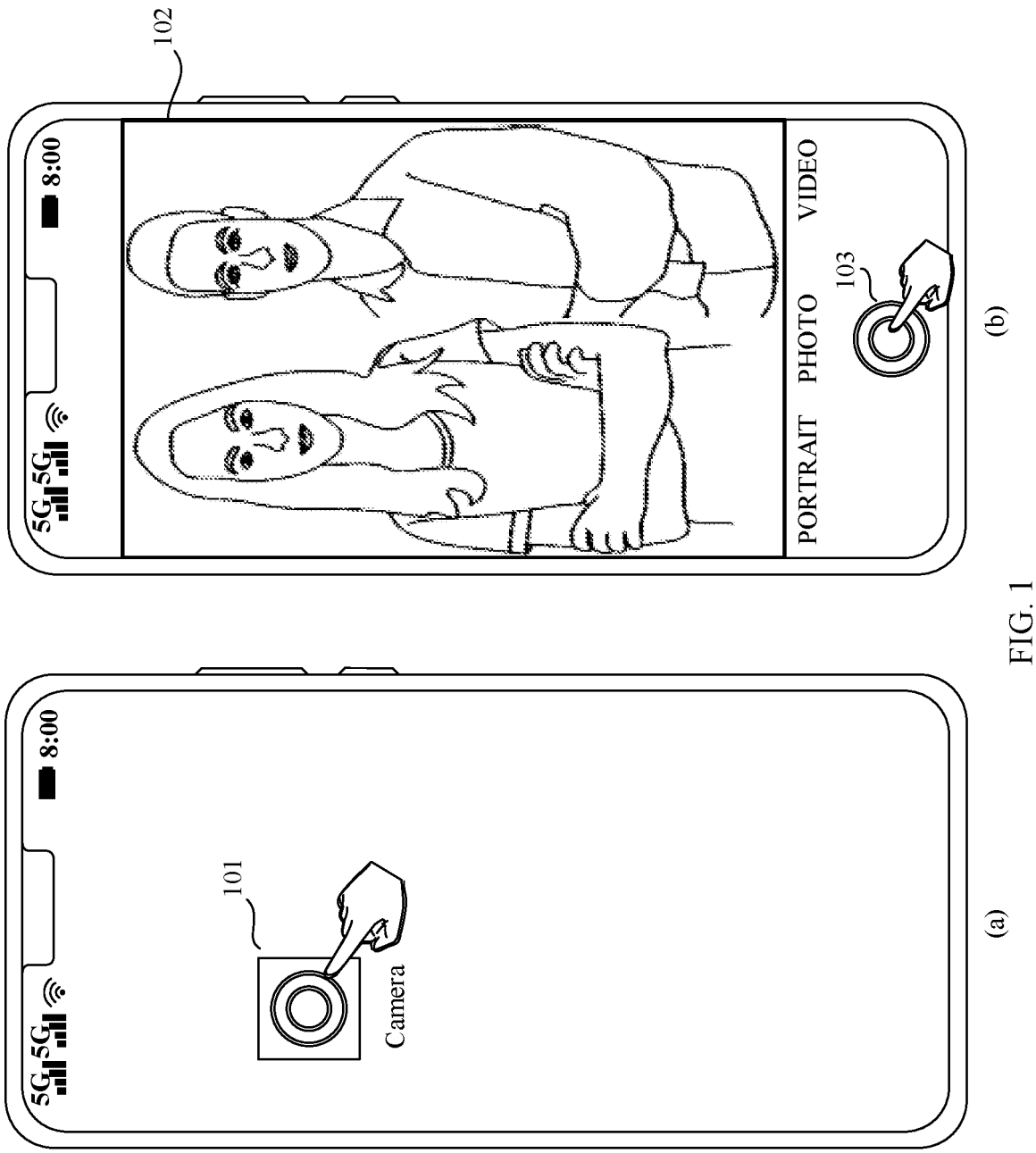
FIG. 1 is a schematic diagram of a shooting procedure.

For example, with reference to FIG. 1, when a scene that the user wants to shoot includes a small quantity of objects (for example, two persons shown in (b) in FIG. 1), a current FOV can cover all the objects, and does not cover a large quantity of other objects. In addition, due to a current output image ratio, distribution of the shot objects in the picture is appropriate. Therefore, it may be considered that the setting of shooting parameters shown in (a) and (b) in FIG. 1 is appropriate. However, if a large quantity of objects (for example, three or more persons) are included in a shooting scene, it is clear that a current FOV cannot cover all the shot objects. In addition, if the output image ratio shown in (b) in FIG. 1 is used, it is clear that the distribution of the shot objects in the photo is inappropriate. Therefore, when the shot object changes, the user needs to manually adjust shooting parameters such as the FOV and the output image ratio, to obtain better shooting quality.

However, with popularization of mobile phones, not all users can quickly adjust the shooting parameter. Therefore, problems of poor image quality or even an image failure caused by an improper shooting parameter usually occur.

Figure 2:
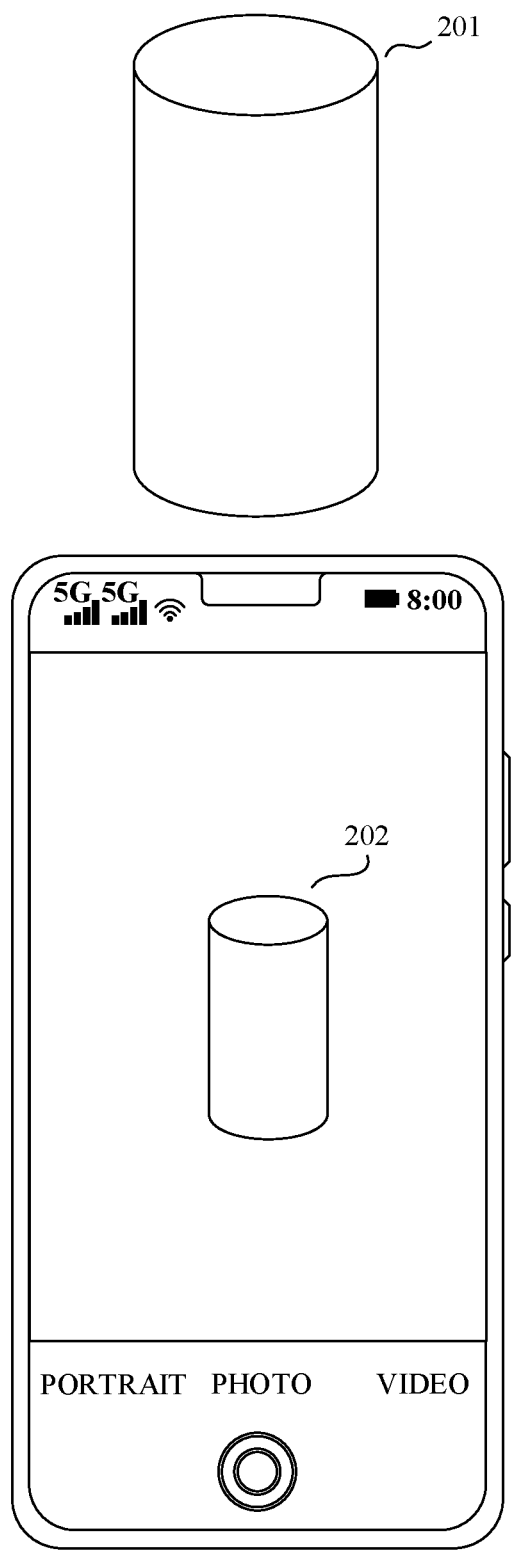
FIG. 2 is a schematic diagram of a shooting scenario.
Figure 3:
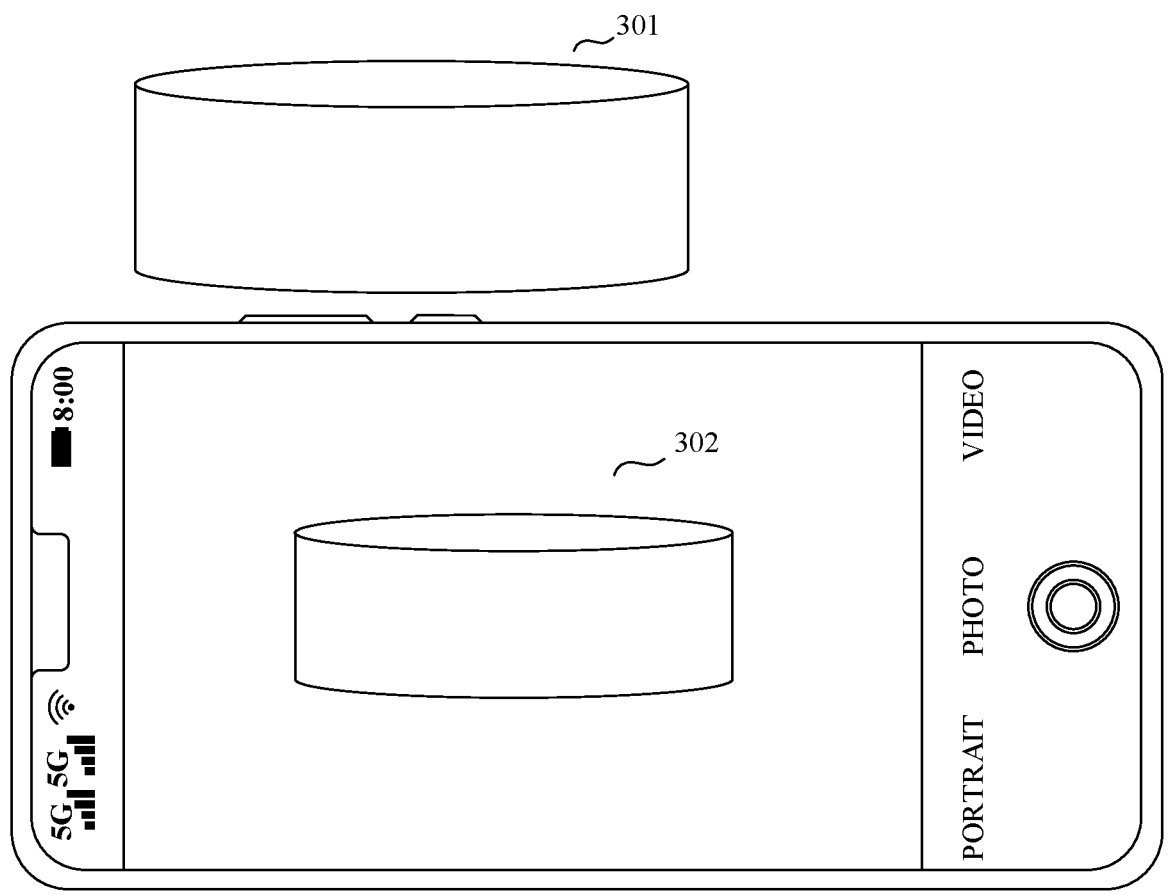
FIG. 3 is a schematic diagram of another shooting scenario.

In addition, when a user uses the mobile phone for shooting, to adjust a length-width ratio of a photo, the mobile phone are hold in different ways, so that the mobile phone can automatically adjust a parameter such as the length-width ratio of the photo. For example, when the user wants to perform large longitudinal image processing, for example, shoot a cylinder 201 shown in FIG. 2, the user may control the mobile phone to perform shooting in a portrait mode, to obtain an image shown in 202 in FIG. 2. When the user wants to perform large transverse image processing, for example, shoot a cylinder 301 shown in FIG. 3, the user may control the mobile phone to perform shooting in a landscape mode, to obtain an image shown in 302 in FIG. 3. With reference to FIG. 2 and FIG. 3, it can be learned that, when size ratios of the shot objects are different, parameters such as different output image ratios are required to obtain good image quality. It should be understood that, FIG. 2 and FIG. 3 are merely simple examples. When the shooting scene is complex, after the user changes a way for holding the mobile phone and only adjusts the image length-width ratio, the shooting parameter may still not be appropriate. Therefore, the user still needs to manually adjust the shooting parameter to obtain better image quality. That is, the mobile phone correspondingly adjusts a length-width ratio of a photo based on different holding manners of the user. Although the image quality can be improved to some extent, high image quality cannot be directly achieved.

To resolve the foregoing problem, an embodiment of this application provides a shooting method, which can be applied to an electronic device having a shooting function. According to the method, based on a shot object and a holding manner of the user, a shooting parameter such as an FOV and/or an output image ratio can be adjusted automatically and adaptively. Therefore, good image quality can be obtained without manual adjustment performed by the user.

The following describes in detail a solution provided in an embodiment of this application with reference to the accompanying drawings.

It should be noted that the shooting method provided in this embodiment of this application may be applied to an electronic device of a user. The electronic device may be a portable mobile device that has a shooting function, such as a mobile phone, a tablet computer, a personal digital assistant (personal digital assistant, PDA), an augmented reality (augmented reality, AR)/virtual reality (virtual reality, VR) device, or a media player. The electronic device may also be a wearable electronic device that can have a shooting capability, such as a smartwatch. A specific form of the device is not particularly limited in this embodiment of this application.

Figure 4:
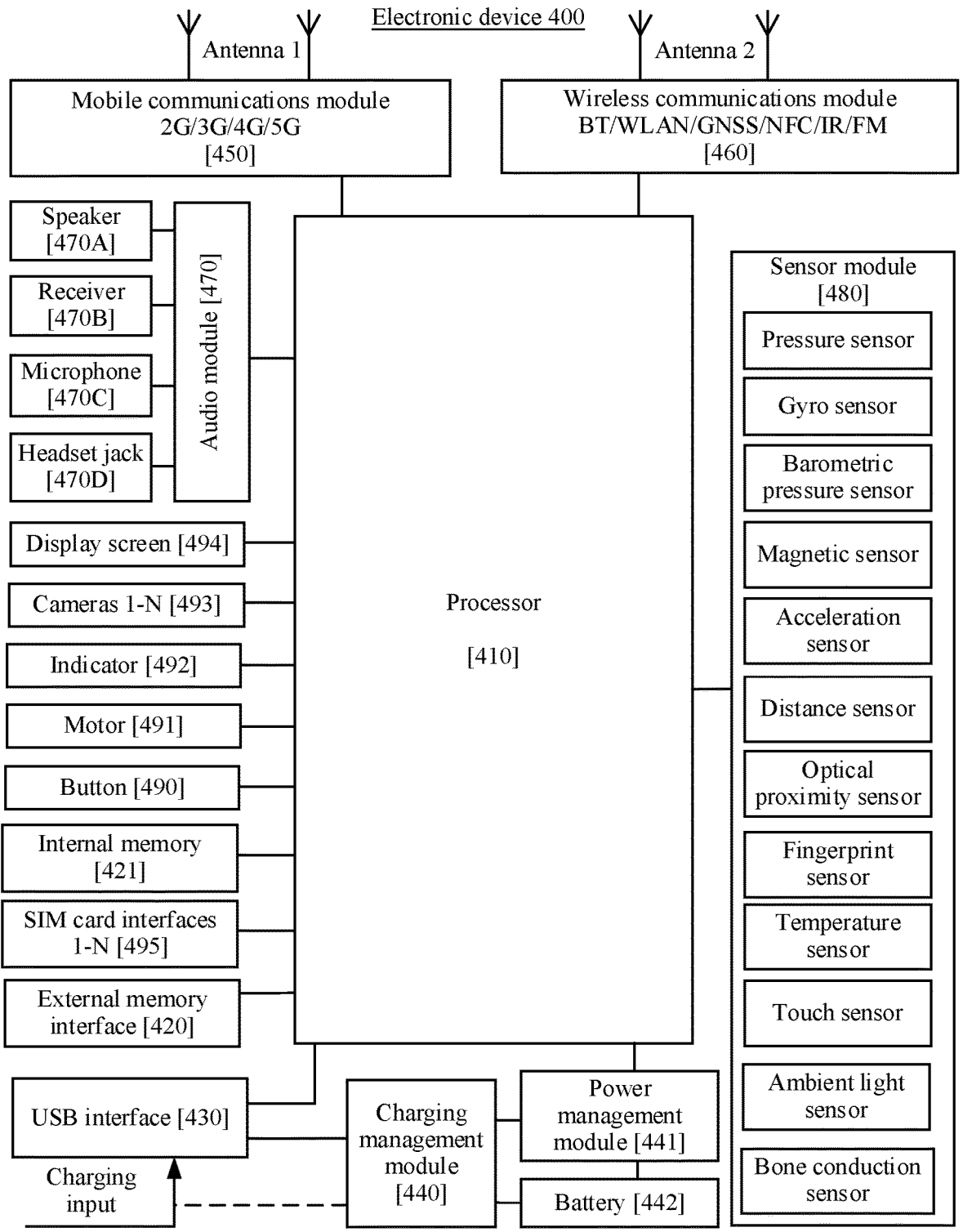
FIG. 4 is a schematic diagram of composition of an electronic device according to an embodiment of this application.

FIG. 4 is a schematic diagram of a structure of an electronic device 400 according to an embodiment of this application. As shown in FIG. 4, the electronic device 400 may include a processor 410, an external memory interface 420, an internal memory 421, a universal serial bus (universal serial bus, USB) port 430, a charging management module 440, a power management module 441, a battery 442, an antenna 1, an antenna 2, a mobile communications module 450, a wireless communications module 460, an audio module 470, a speaker 470A, a receiver 470B, a microphone 470C, a headset jack 470D, a sensor module 480, a button 490, a motor 491, an indicator 492, a camera 493, a display screen 494, a subscriber identity module (subscriber identity module, SIM) card interface 495, and the like. The sensor module 480 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It can be understood that, the structure shown in this embodiment does not constitute a specific limitation on the electronic device 400. In some other embodiments, the electronic device 400 may include more or fewer components than those shown in the figure, or combine some components, or split some components, or have a different component arrangement. The components shown in the figure may be implemented by hardware, software, or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors 410. As an example, in this application, the ISP may process an image. For example, the processing may include processing such as automatic exposure (Automatic Exposure), automatic focus (Automatic Focus), automatic white balance (Automatic White Balance), noise cancellation, backlight compensation, and color enhancement. Automatic exposure, automatic focus, and automatic white balance processing may also be referred to as 3A processing. After the processing, the ISP can obtain a corresponding photo. This process may also be referred to as an image processing operation of the ISP.

The controller may be a nerve center and a command center of the electronic device 400. The controller may generate an operation control signal based on an instruction operation code and a time sequence signal, to complete control of instruction reading and instruction execution.

A memory may be further disposed in the processor 410, to store an instruction and data. In some embodiments, the memory in the processor 410 is a cache. The memory may store an instruction or data that has been used or that is cyclically used by the processor 410. If the processor 410 needs to use the instruction or the data again, the processor 410 may directly invoke the instruction or the data from the memory. This avoids repeated access and reduces a waiting time of the processor 410, thereby improving system efficiency.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The electronic device 400 can implement a shooting function by using the ISP, the camera 493, the video codec, the GPU, the display screen 494, the application processor, and the like.

The ISP is configured to process data fed back by the camera 493. For example, during shooting, a shutter is pressed, and light is transmitted to a photosensitive element of the camera 493 through a lens. An optical signal is converted into an electrical signal, and the photosensitive element of the camera 493 transmits the electrical signal to the ISP for processing, to convert the electrical signal into an image visible to a naked eye. The ISP may further optimize noise, brightness, and complexion of the image by using algorithms. The ISP may further optimize parameters such as exposure and a color temperature of a shooting scene. In some embodiments, the ISP may be disposed in the camera 493.

The camera 493 is configured to capture a static image or shoot a video. An optical image of an object is generated through the lens, and the optical image is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 400 may include one or N cameras 493, where N is a positive integer greater than 1.

The digital signal processor is configured to process a digital signal, and may process another digital signal in addition to the digital image signal. For example, when the electronic device 400 performs frequency selection, the digital signal processor is configured to perform Fourier transform or the like on frequency energy.

The video codec is configured to compress or decompress a digital video. The electronic device 400 may support one or more video codecs. In this way, the electronic device 400 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, and quickly processes input information by emulating a biological neural network structure, for example, by emulating a mode of transmission between human-brain neurons. The NPU can perform self-learning constantly. An application such as intelligent cognition of the electronic device 400 can be implemented with the NPU. For example, image recognition, facial recognition, speech recognition, and text understanding can be performed with the NPU.

The charging management module 440 is configured to receive a charging input from a charger. The charger may be a wireless charger or a wired charger. In some embodiments of wired charging, the charging management module 440 may receive a charging input of the wired charger through the USB port 430. In some embodiments of wireless charging, the charging management module 440 may receive a wireless charging input through a wireless charging coil of the electronic device 400. When charging the battery 442, the charging management module 440 may further supply power to the electronic device 400 by using the power management module 441.

The power management module 441 is configured to connect to the battery 442, the charging management module 440, and the processor 410. The power management module 441 receives an input from the battery 442 and/or the charging management module 440, and supplies power to the processor 410, the internal memory 421, the external memory, the display screen 494, the camera 493, the wireless communications module 460, and the like. The power management module 441 may be further configured to monitor parameters such as a capacity of the battery 442, a cycle count of the battery 442, and a health status (electric leakage or impedance) of the battery 442. In some other embodiments, the power management module 441 may alternatively be disposed in the processor 410. In some other embodiments, the power management module 441 and the charging management module 440 may alternatively be disposed in a same device.

A wireless communications function of the electronic device 400 may be implemented through the antenna 1, the antenna 2, the mobile communications module 450, the wireless communications module 460, the modem processor, the baseband processor, and the like.

The antenna 1 and the antenna 2 are configured to transmit and receive an electromagnetic wave signal. Each antenna in the electronic device 400 may be configured to cover one or more communications frequency bands. Different antennas may be reused, to improve antenna utilization. For example, the antenna 1 may be reused as a diversity antenna of a wireless local area network. In some other embodiments, the antenna may be used in combination with a tuning switch.

The mobile communications module 450 may provide a solution for wireless communications that includes 2G/3G/4G/5G communications or the like and that is applied to the electronic device 400. The mobile communications module 450 may include at least one filter, a switch, a power amplifier, a low noise amplifier (low noise amplifier, LNA), and the like. The mobile communications module 450 may receive an electromagnetic wave through the antenna 1, perform processing such as filtering and amplification on a received electromagnetic wave, and transmit a processed electromagnetic wave to the modem processor for demodulation. The mobile communications module 450 may further amplify a signal modulated by the modem processor, and convert an amplified signal to an electromagnetic wave for radiation through the antenna 1. In some embodiments, at least some functional modules of the mobile communications module 450 may be disposed in the processor 410. In some embodiments, at least some functional modules of the mobile communications module 450 and at least some modules of the processor 410 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 470A, the receiver 470B, or the like), or displays an image or a video on the display screen 494. In some embodiments, the modem processor may be an independent device. In some other embodiments, the modem processor may be independent of the processor 410, and is disposed in a same device with the mobile communications module 450 or another functional module.

The wireless communications module 460 may provide a wireless communications solution that is applied to the electronic device 400 and that includes a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 460 may be one or more devices integrating at least one communications processing module. The wireless communications module 460 receives an electromagnetic wave through the antenna 2, performs frequency modulation and filtering processing on the electromagnetic wave signal, and sends a processed signal to the processor 410. The wireless communications module 460 may further receive a to-be-sent signal from the processor 410, perform frequency modulation, and amplification on the signal, and convert the signal into an electromagnetic wave for radiation through the antenna 2.

In some embodiments, in the electronic device 400, the antenna 1 and the mobile communications module 450 are coupled, and the antenna 2 and the wireless communications module 460 are coupled, so that the electronic device 400 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

In some embodiments, the electronic device 400 may exchange data with a server through the antenna 1 and/or the antenna 2. For example, the electronic device 400 may send a first download request and/or a second download request to the server through the antenna 1 and/or the antenna 2. The electronic device 400 may further receive, through the antenna 1 and/or the antenna 2, a first data segment and/or a second data segment sent by the server.

The electronic device 400 implements a display function by using the GPU, the display screen 494, the application processor 410, and the like. The GPU is a microprocessor for image processing, and is connected to the display screen 494 and the application processor. The GPU is configured to perform mathematical and geometric computation, and is used for graphics rendering. The processor 410 may include one or more GPUs that execute a program instruction to generate or change display information.

The display screen 494 is configured to display an image, a video, and the like. The display screen 494 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Mini-LED, a Micro-LED, a Micro-OLED, a quantum dot light emitting diode (quantum dot light emitting diode, QLED), or the like. In some embodiments, the electronic device 400 may include one or N display screens 494, where N is a positive integer greater than 1.

The external memory interface 420 may be configured to connect to an external memory card, for example, a MicroSD card, to extend storage of the electronic device 400. The external memory card communicates with the processor 410 through the external memory interface 420, to implement a data storage function. For example, files such as music and videos are stored in the external memory card.

The internal memory 421 may be configured to store computer-executable program code. The computer-executable program code includes instructions. The processor 410 runs the instructions stored in the internal memory 421, to perform various functional applications of the electronic device 400 and data processing. The internal memory 421 may include a program storage area and a data storage area. The program storage area may store an operating system, an application required by at least one function (for example, a sound playing function or an image playing function), and the like. The data storage area may store data (such as audio data and a phone book) created during use of the electronic device 400, and the like. In addition, the internal memory 421 may include a high-speed random access memory, and may further include a non-volatile memory, for example, at least one magnetic disk storage device, a flash memory, or a universal flash storage (universal flash storage, UFS).

In this embodiment of this application, the internal memory 421 may be configured to store a cached network video. In some implementations, the network video may also be stored in an external storage medium connected by using the external memory interface 420.

The electronic device 400 may use the audio module 470, the speaker 470A, the receiver 470B, the microphone 470C, the headset jack 470D, the application processor 410, and the like to implement an audio function, for example, music playing and recording.

The audio module 470 is configured to convert digital audio information into an analog audio signal output, and is also configured to convert an analog audio input into a digital audio signal. The audio module 470 may be further configured to encode and decode an audio signal. In some embodiments, the audio module 470 may be disposed in the processor 410, or some functional modules of the audio module 470 may be disposed in the processor 410.

The speaker 470A, also referred to as a "loudspeaker", is configured to convert an audio electrical signal into a sound signal. The electronic device 400 may play music or answer a call in a hands-free mode over the speaker 470A.

The receiver 470B, also referred to as an "earpiece", is configured to convert an audio electrical signal into a sound signal. When a call is answered or audio information is listened to by using the electronic device 400, the receiver 470B may be put close to a human ear to listen to a voice.

The microphone 470C, also referred to as a "mike" or a "mic", is configured to convert a sound signal into an electrical signal. When making a call or sending voice information or triggering the electronic device 400 by using a voice assistant to perform some functions, the user may approach the microphone 470C to make a sound with a mouth, so as to input a sound signal to the microphone 470C. At least one microphone 470C is disposed in the electronic device 400. In some other embodiments, two microphones 470C may be disposed in the electronic device 400, to collect the sound signal and implement a noise cancellation function. In some other embodiments, three, four, or more microphones 470C may alternatively be disposed in the electronic device 400, to collect the sound signal, implement noise cancellation, identify a sound source, implement a directional recording function, and the like.

The headset jack 470D is configured to connect to a wired headset. The headset jack 470D may be a USB port 430, or may be a 3.5 mm open mobile terminal platform (open mobile terminal platform, OMTP) standard interface, or a cellular telecommunications industry association of the USA (cellular telecommunications industry association of the USA, CTIA) standard interface.

The touch sensor is also referred to as a "touch panel". The touch sensor may be disposed in the display screen 494, so that the touch sensor and the display screen 494 constitute a touchscreen that is also referred to as a "touch screen". The touch sensor is configured to detect a touch operation performed on or near the touch sensor. The touch sensor may transfer a detected touch operation to the application processor to determine a touch event type. In some embodiments, a visual output related to the touch operation may be provided by using the display screen 494. In some other embodiments, the touch sensor may be alternatively disposed on a surface of the electronic device 400, at a location different from that of the display screen 494.

The pressure sensor is configured to sense a pressure signal, and can convert the pressure signal into the electrical signal. In some embodiments, the pressure sensor may be disposed on the display screen 494. There are many types of pressure sensors such as a resistive pressure sensor, an inductive pressure sensor, and a capacitive pressure sensor. The capacitive pressure sensor may include at least two parallel plates made of conductive materials. When a force is applied to the pressure sensor, capacitance between electrodes changes. The electronic device 400 determines pressure intensity based on a change in capacitance. When a touch operation is performed on the display screen 494, the electronic device 400 detects a strength of the touch operation by using the pressure sensor. The electronic device 400 may also calculate a touch location based on a detection signal of the pressure sensor. In some embodiments, touch operations that are performed on a same touch location but have different touch strengths may correspond to different operation instructions. For example, when a touch operation whose touch strength is less than a first pressure threshold is performed on an SMS message application icon, an instruction of viewing an SMS message is executed. When a touch operation whose touch strength is greater than or equal to the first pressure threshold is performed on the SMS message application icon, an instruction of creating an SMS message is executed.

The gyro sensor may be configured to determine a motion posture of the electronic device 400. In some embodiments, angular velocities of the electronic device 400 around three axes (that is, x, y, and z axes) can be determined by using the gyro sensor. The gyro sensor may be used for image stabilization during shooting. For example, when the shutter is pressed, the gyro sensor detects a shaking angle of the electronic device 400, and calculates, based on the angle, a distance for which a lens module needs to compensate, so as to cancel shaking of the electronic device 400 through reverse motion of the lens and achieve image stabilization. The gyro sensor may also be used in navigation and a motion sensing game scenario.

The barometric pressure sensor is configured to measure barometric pressure. In some embodiments, the electronic device 400 calculates an altitude based on a barometric pressure value measured by the barometric pressure sensor to assist in positioning and navigation.

The magnetic sensor includes a Hall sensor. The electronic device 400 may detect opening and closing of a flip holster by using the magnetic sensor. In some embodiments, when the electronic device 400 is a clamshell device, the electronic device 400 may detect opening and closing of a clamshell by using the magnetic sensor. Further, a feature such as automatic unlocking through flipping is set based on a detected opening or closing state of the flip cover or a detected opening or closing state of the clamshell.

The acceleration sensor may detect magnitudes of accelerations of the electronic device 400 in various directions (generally along three axes). When the electronic device 400 is static, a magnitude and a direction of gravity may be detected. The acceleration sensor may be further configured to identify a posture of the electronic device 400, and is used in an application such as screen switching between a landscape screen and a portrait screen, and a pedometer.

The distance sensor is configured to measure a distance. The electronic device 400 may measure a distance by using infrared or laser. In some embodiments, in a shooting scene, the electronic device 400 may use the distance sensor to measure a distance to achieve fast focusing.

For example, the optical proximity sensor may include a light emitting diode (LED) and an optical detector, for example, a photodiode. The light emitting diode may be an infrared emitting diode. The electronic device 400 emits infrared light by using the light emitting diode. The electronic device 400 uses the photodiode to detect reflected infrared light from a nearby object. When sufficient reflected light is detected, it may be determined that there is an object near the electronic device 400. When insufficient reflected light is detected, the electronic device 400 may determine that there is no object near the electronic device 400. The electronic device 400 may use the optical proximity sensor to determine that a user holds the electronic device 400 close to an ear for a call, so as to automatically turn off the display screen to save power. The optical proximity sensor may also be used in a smart cover mode or pocket mode for automatic unlocking and screen locking.

The ambient light sensor is configured to sense ambient luminance. The electronic device 400 may adaptively adjust brightness of the display screen 494 based on sensed ambient luminance. The ambient light sensor may also be configured to automatically adjust white balance during shooting. The ambient light sensor may further cooperate with the optical proximity sensor in detecting whether the electronic device 400 is in a pocket, to prevent an accidental touch.

The fingerprint sensor is configured to collect a fingerprint. The electronic device 400 may use a collected fingerprint feature to implement fingerprint unlocking, application lock access, fingerprint-based shooting, fingerprint-based call answering, and the like.

The temperature sensor is configured to detect a temperature. In some embodiments, the electronic device 400 executes a temperature processing policy based on a temperature detected by the temperature sensor. For example, when a temperature reported by the temperature sensor exceeds a threshold, the electronic device 400 degrades performance of a processor 410 near the temperature sensor, to reduce power consumption and implement thermal protection. In some other embodiments, when a temperature is below another threshold, the electronic device 400 heats the battery 442 to avoid abnormal shutdown of the electronic device 400 caused by low temperature. In some other embodiments, when a temperature is below another threshold, the electronic device 400 boosts an output voltage of the battery 442 to avoid abnormal shutdown caused by low temperature.

The bone conduction sensor may obtain a vibration signal. In some embodiments, the bone conduction sensor may obtain a vibration signal of a vibration bone of a human vocal part. The bone conduction sensor may also be in contact with a pulse of a human body and receive a blood pressure beat signal. In some embodiments, the bone conduction sensor may be disposed in a headset, to be integrated into a bone conduction headset. The audio module 470 may parse out a voice signal based on the vibration signal of the vibration bone of the vocal part obtained by the bone conduction sensor, to implement a voice function. The application processor may parse out heart rate information based on the blood pressure beat signal obtained by the bone conduction sensor, to implement a heart rate detection function.

The button 490 includes a power button, a volume button, and the like. The button 490 may be a mechanical button 490, or may be a touch button 490. The electronic device 400 may receive an input of the button 490, and generate a button signal input related to a user setting and function control of the electronic device 400.

The motor 491 may generate a vibration alert. The motor 491 may be used for vibration alerts for incoming calls, and may also be used for touch vibration feedback. For example, touch operations on different applications (such as shooting and audio playing) may correspond to different vibration feedback effects. The motor 491 may also provide different vibration feedback effects corresponding to touch operations performed on different areas of the display screen 494. Different application scenarios (for example, a time reminder, information receiving, an alarm clock, and a game) may also correspond to different vibration feedback effects. A touch vibration feedback effect may be further customized.

The indicator 492 may be an indicator light, and may be configured to indicate a charging status and a power change, or may be configured to indicate a message, a missed call, a notification, and the like.

The SIM card interface 495 is configured to connect a SIM card. The SIM card may be inserted into the SIM card interface 495 or removed from the SIM card interface 495, to implement contact with or separation from the electronic device 400. The electronic device 400 may support one or N SIM card interfaces 495, where N is a positive integer greater than 1. The SIM card interface 495 may support a nano-SIM card, a micro-SIM card, a SIM card, and the like. A plurality of cards may be simultaneously inserted into a same SIM card interface 495. Types of the plurality of cards may be the same or different. Different types of SIM cards are also compatible in the SIM card interface 495. The SIM card interface 495 may also be compatible with an external memory card. The electronic device 400 interacts with a network through the SIM card to implement functions such as calling and data communications. In some embodiments, the electronic device 400 uses an eSIM, that is, an embedded SIM card. The eSIM card may be embedded into the electronic device 400, and cannot be separated from the electronic device 400.

The shooting method provided in this embodiment of this application can be applied to the electronic device 400 shown in FIG. 4.

As an example, when the user starts to use the electronic device 400 to perform shooting, the electronic device 400 may adaptively adjust the shooting parameter based on a holding manner (for example, the device is in a landscape screen state or a portrait screen state) of the user and/or a quantity of valid objects included in a current preview image. Therefore, when the user performs shooting, the electronic device 400 can perform image processing according to an adjusted shooting parameter, to obtain a photo with high image quality.

It should be noted that the electronic device 400 is described in FIG. 4 from a perspective of hardware composition. It should be understood that when the electronic device 400 runs, an operating system may run in the processor 410 of the electronic device 400. The operating system may include one or more applications (applications, APPs). The APP in the operating system may include a system-level application, for example, a camera, a note, a browser, or an address book. A non-system-level application may be further included, for example, a third-party APP that can provide a shooting function. When the electronic device 400 controls the APP in the electronic device 400 to run in the operating system, the electronic device 400 may be enabled to provide a function corresponding to the APP.

Figure 5:
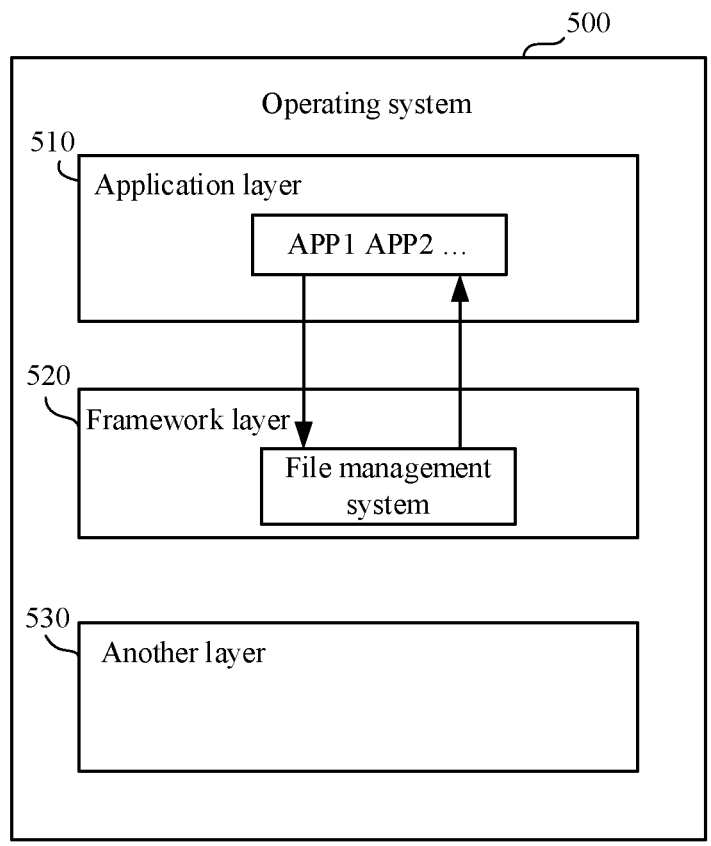
FIG. 5 is a schematic diagram of composition of an operating system according to an embodiment of this application.

As an example, FIG. 5 is a schematic diagram of composition of an operating system 500 according to an embodiment of this application. As shown in FIG. 5, the operating system 500 may include an application layer 510, a framework layer 520, and another layer 530. One or more applications, such as APP1 and APP2 shown in FIG. 5, may be set in the application layer 510. A file management system may be disposed at the framework layer 520. The file management system may be configured to determine and perform a corresponding response operation based on event information from the application layer 510. The file management system may further control a corresponding APP of the application layer 510 to display a corresponding interface and the like when performing the foregoing response operation. The operating system 500 having the composition shown in FIG. 5 may implement various functions of the electronic device 400 in cooperation with another hardware module in the electronic device 400.

The following describes in detail a shooting method provided in an embodiment of this application with reference to the accompanying drawings. The method may be applied to the electronic device 400 having the composition shown in FIG. 4, or may be applied to an electronic device that has the divided operating system 500 shown in FIG. 5. For ease of description, the following uses an example in which the method is applied to a mobile phone provided with a camera.

Figure 6:
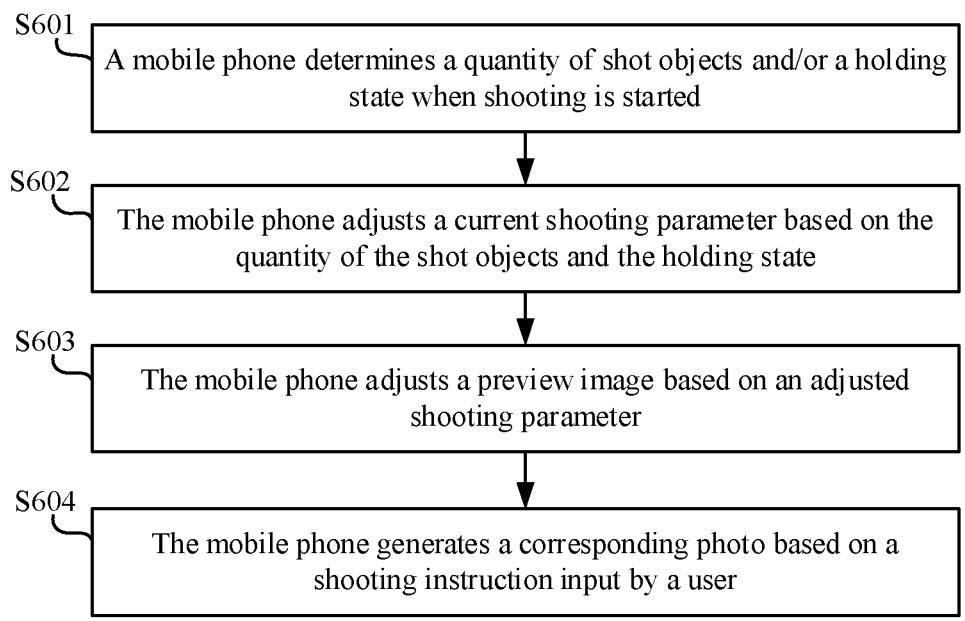
FIG. 6 is a schematic flowchart of a shooting method according to an embodiment of this application.

FIG. 6 is a schematic flowchart of a shooting method according to an embodiment of this application. As shown in FIG. 6, the method may include S601 to S604.

S601: A mobile phone determines a quantity of shot objects and/or a holding state when shooting is started.

The holding state may include a landscape screen state and a portrait screen state.

S602: The mobile phone adjusts a current shooting parameter based on the quantity of the shot objects and the holding state.

The shooting parameter may include one or more parameters such as an FOV and an output image ratio.

In this example, the mobile phone may determine to start shooting when receiving an operation of opening a shooting "Camera" APP or another APP that can provide a shooting function by a user. For example, the user may input a corresponding operation on an icon of the "Camera" APP on the screen of the mobile phone, to open the "Camera" APP. The corresponding operation may be an operation such as a tap, a touch, or a double-tap. The mobile phone may receive the operation, and generate a corresponding event in response to the operation. For example, an Android application package (Android application package, APK) corresponding to the "Camera" APP at an application layer may determine that a touchscreen of the mobile phone receives an operation of opening the "Camera" APP by the user, and in response to the operation, the APK may generate a corresponding event. For example, the APK may generate an event used to indicate the "Camera" APP to run. A file management system at a framework layer in the mobile phone may monitor the event. When the file management system monitors the event, the mobile phone may determine that shooting is started.

Figure 7:
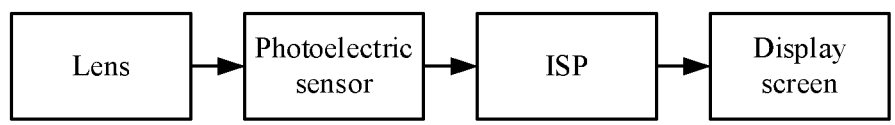
FIG. 7 is a schematic diagram of a shooting procedure according to an embodiment of this application.
Figure 8:
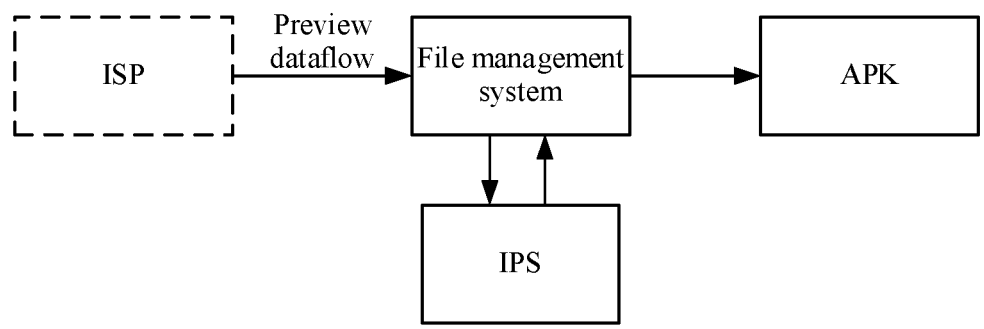
FIG. 8 is a schematic diagram of another shooting procedure according to an embodiment of this application.

It may be understood that, when the mobile phone starts shooting, the mobile phone may obtain, by using the camera thereof, an optical signal corresponding to an object in a current scene, and generate a preview image based on the optical signal. For example, refer to FIG. 4. As shown in FIG. 7, after obtaining the optical signal, a lens in the camera may transmit the optical signal to a photoelectric sensor. The photoelectric sensor may generate a corresponding electrical signal flow based on distribution of optical signals at different locations. The photoelectric sensor may transmit the electrical signal flow to an ISP. After being processed by the ISP, the preview image may be displayed at a corresponding location on a display screen. A process in which the ISP processes and obtains the preview image, and displays the preview image on the display screen, may be implemented through interaction between the file management system corresponding to the "Camera" APP and the APK of the "Camera" APP in the operating system. For example, as shown in FIG. 8, after processing and obtaining a dataflow (for example, referred to as preview dataflow (preview dataflow)) corresponding to the preview image, the ISP may transmit the preview dataflow to the APK through the file management system. After the APK receives the preview dataflow, a corresponding preview image may be displayed in a preview area on the display screen based on the preview dataflow.

In the example, as shown in FIG. 8, the ISP may control the file management system to transmit the preview dataflow to an image processing system (Image Processing System, IPS). The IPS may be configured to determine, based on the preview dataflow, a quantity of valid objects included in a current preview image. For example, the user uses a mobile phone to perform portrait shooting, and a quantity of valid objects may be a quantity of faces that can be clearly imaged in the preview image. The IPS may determine, based on the quantity of faces, whether to adjust a shooting parameter such as an FOV. For example, when the quantity of faces is greater than a threshold 1 (for example, the threshold 1 may be set to 2), the IPS determines to use a corresponding FOV1 to perform the image processing. For another example, when the quantity of faces is less than 2, the IPS determines to use a corresponding FOV2 to perform the image processing. The IPS may feed back the determined FOV1 or FOV2 to the file management system, so that the file management system may forward the parameter to the ISP to enable the ISP to perform the image processing based on the FOV1 or FOV2.

The foregoing example in which the shooting parameter includes the FOV is used for description. In some other implementations of this application, the shooting parameter may further include an output image ratio. For example, the IPS may determine, based on the quantity of faces, whether adjustment needs to be performed based on a current output image ratio. For example, when the quantity of faces is greater than a threshold 2 (for example, the threshold 2 may also be set to 2), the IPS determines to use a corresponding output image ratio 1 to perform the image processing. For another example, when the quantity of faces is less than 2, the IPS determines to use a corresponding output image ratio 2 to perform the image processing. The IPS may feed back the determined output image ratio 1 or output image ratio 2 to the file management system, so that the file management system may forward the parameter to the ISP to enable the ISP to perform the image processing based on the output image ratio 1 or the output image ratio 2.

With reference to the foregoing two examples, in different implementation scenarios, a corresponding shooting parameter may be selected for adaptive adjustment. An FOV and an output image ratio may also be adaptively adjusted based on a quantity of faces. A specific execution process thereof is similar. Details are not described herein again.

It should be noted that, the foregoing example in which the mobile phone adjusts the FOV and/or the output image ratio based on the quantity of faces is used for description. In some other implementations of this application, the mobile phone may further adjust the FOV and/or the output image ratio based on a current holding manner (for example, the mobile phone is in a landscape screen state or a portrait screen state) of the mobile phone.

For example, in some implementations, the mobile phone may determine a current holding manner based on the preview image. For example, when a direction of a height of the shot object in the preview image is parallel or approximately parallel to a long side of the image, it is determined that the mobile phone is currently in the portrait screen state. For another example, when the direction of the height of the shot object in the preview image is perpendicular to or approximately perpendicular to the long side of the image, it is determined that the mobile phone is currently in the landscape screen state. In some other implementations, the mobile phone may determine, based on components such as a gyro sensor and a gravity sensor in a sensor module of the mobile phone, that the mobile phone is currently in the landscape screen state or the portrait screen state. The mobile phone may further comprehensively analyze, with reference to both a determining result of the preview image and a determining result of the sensor module, whether the mobile phone is in the landscape screen state or the portrait screen state.

When the mobile phone determines that the mobile phone is in the landscape screen state or the portrait screen state, the mobile phone may determine, based on a determining result, whether the FOV and/or the output image ratio need/needs to be adjusted.

For example, when determining that the mobile phone is in the landscape screen state, the mobile phone may adjust the FOV to an FOV3. When determining that the mobile phone is in the portrait screen state, the mobile phone adjusts the FOV to an FOV4.

In some other implementations, when determining that the mobile phone is in the landscape screen state, the mobile phone may adjust the output image ratio to an output image ratio 3. Correspondingly, when determining that the mobile phone is in the portrait screen state, the mobile phone may adjust the output image ratio to an output image ratio 4.

In some other implementations, the mobile phone may adjust both the FOV and the output image ratio based on the landscape screen state or the portrait screen state. This is not limited in this embodiment of this application.

Similar to adjusting the FOV and/or the output image ratio based on the quantity of faces as described in the foregoing solution, after determining the FOV and/or the output image ratio based on the holding manner, the mobile phone may transmit the shooting parameter to the IPS, and during shooting, the IPS may perform the image processing on an obtained image based on the determined shooting parameter, to obtain a corresponding photo.

It should be noted that, in the foregoing example, the solutions of determining the FOV and/or the output image ratio based on the quantity of faces and the holding manner are separately described. In some other implementation scenarios of this application, when obtaining the preview image, the mobile phone may use the foregoing two solutions at the same time, to obtain a more accurate result of FOV and/or output image ratio adjustment.

For example, the mobile phone may set the FOV to an FOV5 when a quantity of persons is greater than a threshold 3 (for example, the threshold 3 is set to 2) and the mobile phone is in the landscape screen state. Correspondingly, the mobile phone may set the FOV to an FOV6 when the quantity of persons is less than 2 and the mobile phone is in the landscape screen state. When the quantity of persons is greater than 2 and the mobile phone is in the portrait screen state, the FOV can be set to an FOV7. When the quantity of persons is less than 2 and the mobile phone is in the portrait screen state, the FOV can be set to an FOV8.

The mobile phone may further adjust both the FOV and the output image ratio based on a relationship between the quantity of persons in the preview image and the preset threshold of the quantity of persons, and the landscape/portrait screen state of the mobile phone. An adjustment manner is similar to that described above. Details are not described herein again.

It should be noted that, specific values of the FOV1 to FOV8 and the output image ratio 1 to the output image ratio 4 in the foregoing examples may be flexibly selected based on an actual scenario, or may be obtained through an experiment and preset in the electronic device before the electronic device is delivered from a factory.

S603: The mobile phone adjusts the preview image based on an adjusted shooting parameter.

S604: The mobile phone generates a corresponding photo based on a shooting instruction input by the user.

After determining the shooting parameter, the mobile phone may process, based on the shooting parameter, a related parameter used in the image shooting process. For example, the related parameter may include whether a common lens or a wide-angle lens is used, and the related parameter may further include a parameter such as a focal length of a camera that captures an image.

For example, the shooting parameter includes an FOV and an output image ratio.

In some implementations, the ISP in the mobile phone may process the preview image based on the FOV, the output image ratio, and another parameter.

Figure 9:
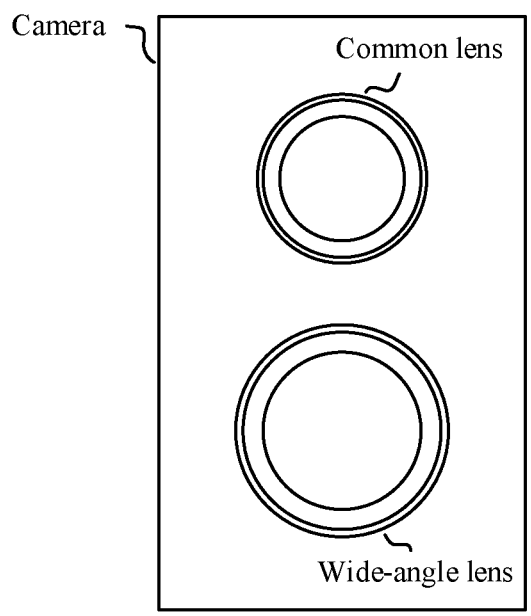
FIG. 9 is a schematic diagram of composition of a camera according to an embodiment of this application.

In a possible implementation, the mobile phone may select, based on the FOV, a corresponding lens to perform framing and shooting. For example, a common lens and a wide-angle lens shown in FIG. 9 are disposed on a camera used for current shooting in the mobile phone. When the FOV determined according to S601 to S602 is greater than a corresponding preset FOV threshold, the mobile phone uses the wide-angle lens shown in FIG. 9 and adjusts a corresponding FOV, to perform framing and shooting. In this way, a larger range can be framed, to meet a requirement for a large FOV. Correspondingly, when the FOV determined according to S601 to S602 is less than the corresponding preset FOV threshold, the mobile phone uses the common lens shown in FIG. 9 to perform framing and shooting. In this way, framing and shooting can be performed in a corresponding FOV. It should be noted that, in this example, the camera used for current shooting may be a rear camera of the mobile phone, or may be a front camera of the mobile phone. When the camera used for current shooting is the front camera, a shooting scenario may be a selfie taking scenario of the user. It should be noted that in this example, the camera is an example of a camera module. In some other implementation scenarios, the camera module may alternatively have different forms.

In another possible implementation, the mobile phone may not switch the camera based on the FOV. For example, the mobile phone currently uses the wide-angle lens for framing. When the FOV determined according to S601 to S602 (for example, an FOV9) is large, the wide-angle lens is controlled to adjust the current FOV to the FOV9 to perform framing and shooting. When the FOV determined according to S601 to S602 (for example, an FOV10) is small, the wide-angle lens is controlled to adjust the current FOV to FOV10 to perform framing and shooting. It should be noted that the example in which the mobile phone controls the wide-angle lens to adjust the FOV to a required value is used for description. In some other implementations, the mobile phone may alternatively not adjust the FOV of the wide-angle lens, but perform framing based on a current FOV or a maximum FOV. To adjust the FOV, the ISP crops an obtained image based on the FOV determined according to S601 to S602. It may be understood that, when the mobile phone currently uses the common lens for framing, and the FOV determined according to S601 to S602 is greater than a maximum FOV that can be provided by the common lens, the mobile phone may switch to the wide-angle lens to perform framing. In some other implementations, the mobile phone may not switch the lens, but use the maximum FOV of the common lens to perform framing. For example, only one camera is disposed in a camera module (for example, a front camera module or a rear camera module) used by the mobile phone for shooting, or two or more cameras are disposed. In addition, a common lens is currently used, and a wide-angle lens is faulty or cannot be used. When a determined FOV is greater than an FOV used by the current lens, the mobile phone may adjust the FOV of the lens to a maximum FOV that can be provided by the current lens to perform framing, so as to obtain an effect of performing framing by using an FOV close to the determined FOV.

Refer to the description shown in FIG. 7. After a corresponding optical signal is obtained by using a selected lens, the ISP may process the corresponding signal, to obtain a preview image corresponding to a FOV of a current shooting scene. In a process of generating the preview image, the ISP may adjust a ratio of the preview image based on the output image ratio determined in S601 to S602, so as to obtain a preview image corresponding to the output image ratio. In this way, a preview image that is adjusted based on the FOV and the output image ratio can be obtained.

It may be understood that the mobile phone may display an adjusted preview image on the display screen. When determining that the preview image meets a shooting requirement, the user may input a corresponding shooting operation on the mobile phone. For example, the user may input a corresponding operation in the manner described in FIG. 1. The mobile phone may receive the operation, and control, in response to the operation, the ISP to perform image processing, so as to obtain a photo corresponding to the adjusted preview image. The mobile phone may store the photo for subsequent use or viewing by the user.

It should be noted that an example in which the mobile phone adjusts the preview image based on the adjusted FOV and the output image ratio to complete image processing is used above for description. In some other embodiments of this application, the mobile phone may alternatively not adjust the preview image, but directly adjust, when the ISP performs image processing, an obtained final photo based on the FOV and/or the output image ratio determined in the method shown in S601 to S602, to obtain an optimized photo for storage.

In this way, according to the foregoing description of the method shown in FIG. 6, it can be learned that in this embodiment of this application, the mobile phone may adaptively adjust the shooting parameter based on a quantity of current shot objects (for example, a quantity of faces) and/or a holding manner of the mobile phone (for example, the mobile phone is in a landscape screen state or a portrait screen state). For example, the mobile phone may adaptively adjust an output image ratio based on the quantity of faces. For another example, the mobile phone may adaptively adjust the output image ratio based on the holding manner. For another example, the mobile phone may comprehensively determine and adaptively adjust the output image ratio based on the quantity of faces and the holding manner. For another example, the mobile phone may determine, based on the quantity of faces and the holding manner, whether the FOV needs to be adjusted. For another example, the mobile phone may adaptively adjust the FOV, the output image ratio, and the like based on the quantity of faces and the holding manner. In this way, the mobile phone can obtain a preview image or a photo that fits the current shot object, thereby improving image processing quality.

It should be noted that, in some implementations, the solutions provided in the embodiment of this application may be preset in the mobile phone and take effect in real time, to provide an intelligent prompt of a shooting parameter for the user. This improves the image processing quality during shooting. In some other implementations, the user may actively control enabling or disabling of the function in the mobile phone, to implement active control. For example, as shown in FIG. 10(*a*), when the "Camera" APP of the mobile phone is opened, an interface of the "Camera" APP may include a setting button 1001. The user may input a corresponding operation on the setting button 1001, to set a related parameter in a shooting process. A corresponding operation may be an operation performed by the user on the setting button 1001, such as a tap and a touch. In response to the operation, the mobile phone may display, on the display screen of the mobile phone, an interface shown in FIG. 10(*b*). The interface may include content shown in 1002, which is used to prompt the user to enable or disable execution of the solution shown in FIG. 6. For example, as shown in 1002, the content may be a button 1003 for "automatic shooting parameter setting". The user may input a corresponding operation on the button 1003, to control enabling of automatic shooting parameter setting. For example, when the user taps the button 1003 to set the button to a state shown in FIG. 10(b), the mobile phone may adaptively adjust a shooting parameter, such as an FOV and/or an output image ratio according to the method shown in FIG. 6. For another example, when the user taps the button 1003 to set the button to a state shown in FIG. 10(c), the mobile phone may not automatically execute the solution shown in FIG. 6, but generate a preview image based on a current shooting parameter and perform an image processing operation to generate a photo. In this way, the user can actively determine whether to execute the solution.

Figure 10A:
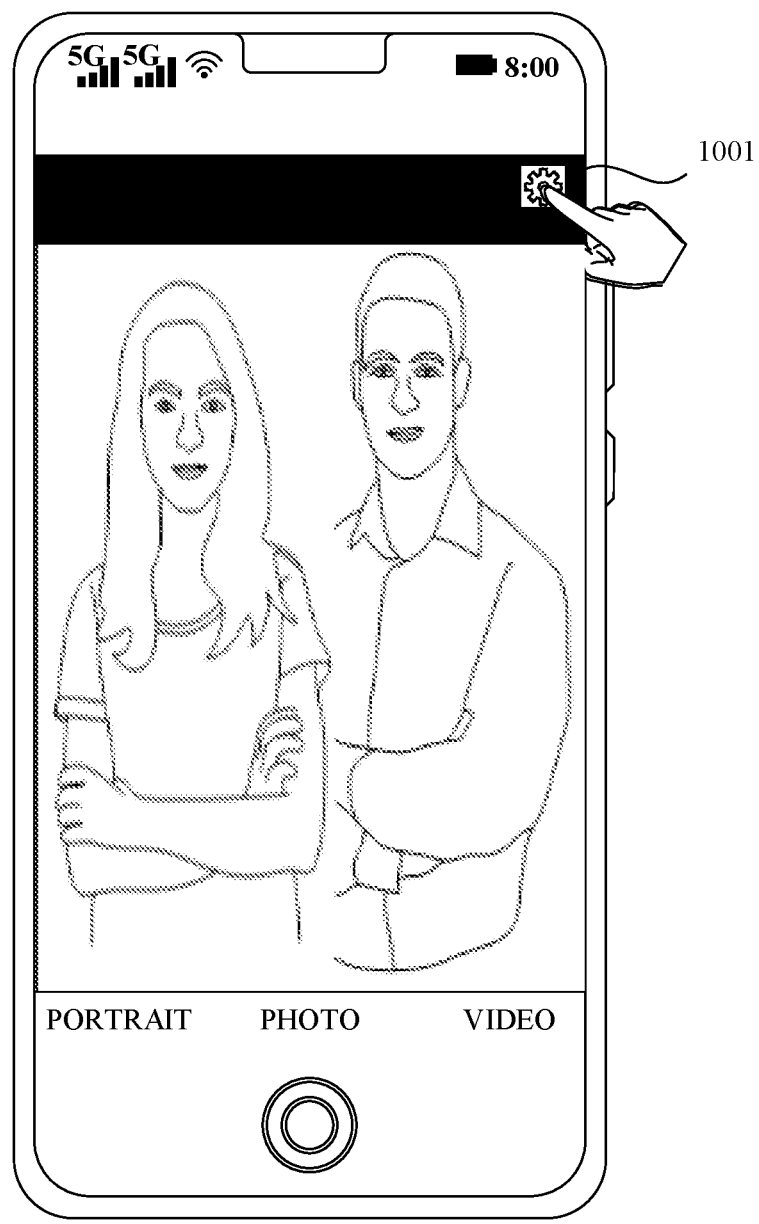
FIG. 10(a) to FIG. 10(c) are schematic diagrams of setting interfaces according to an embodiment of this application.
Figure 10B:
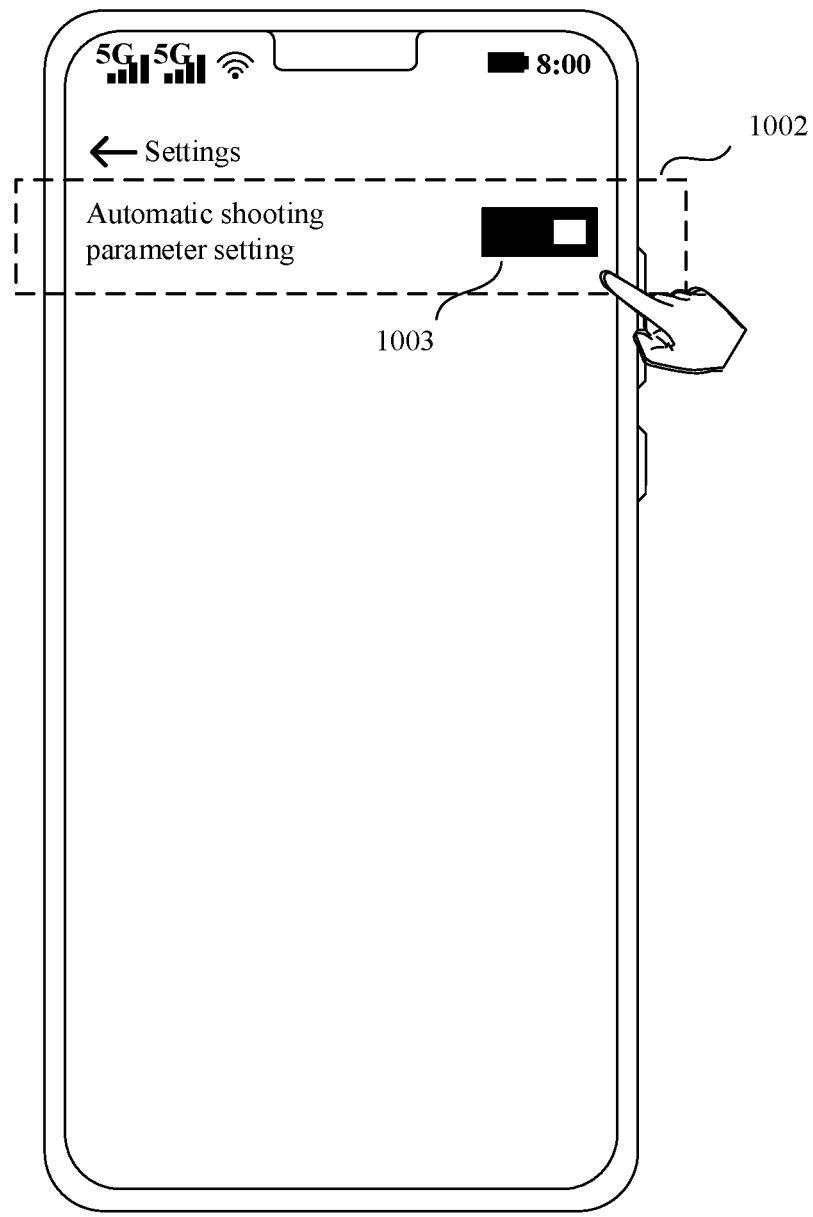
Figure 10C:
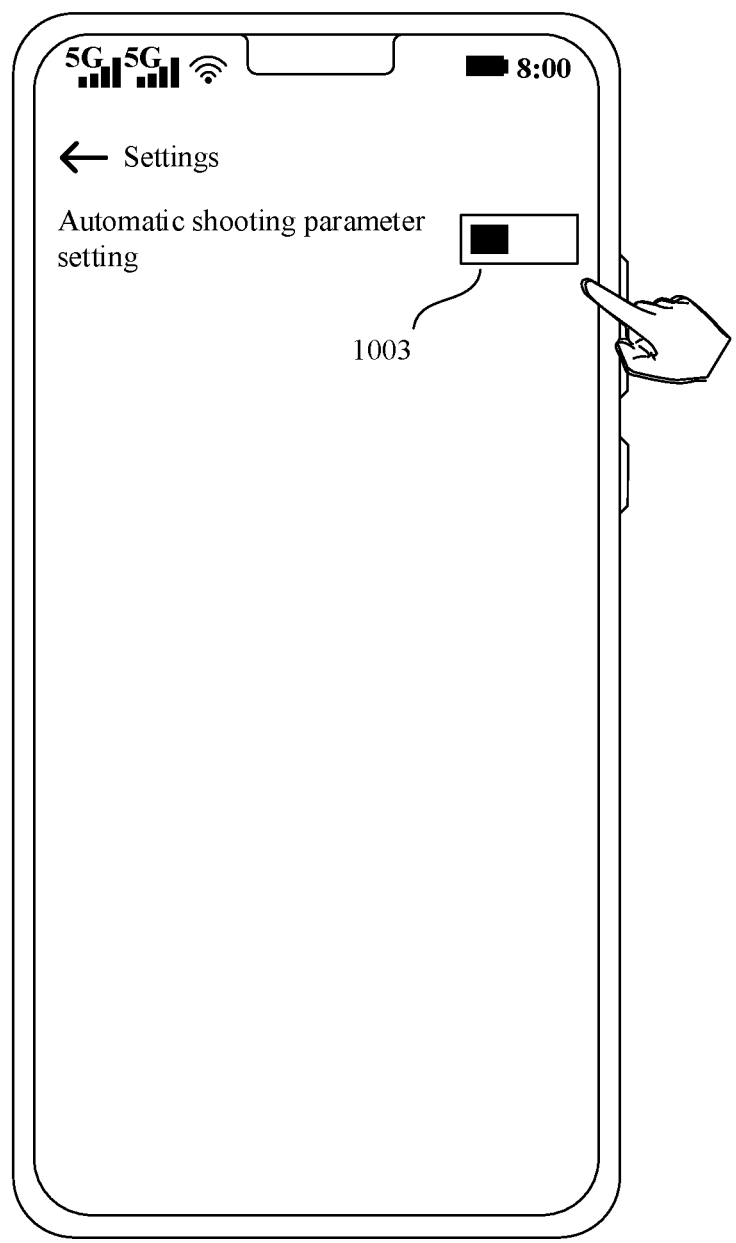
Figure 11:
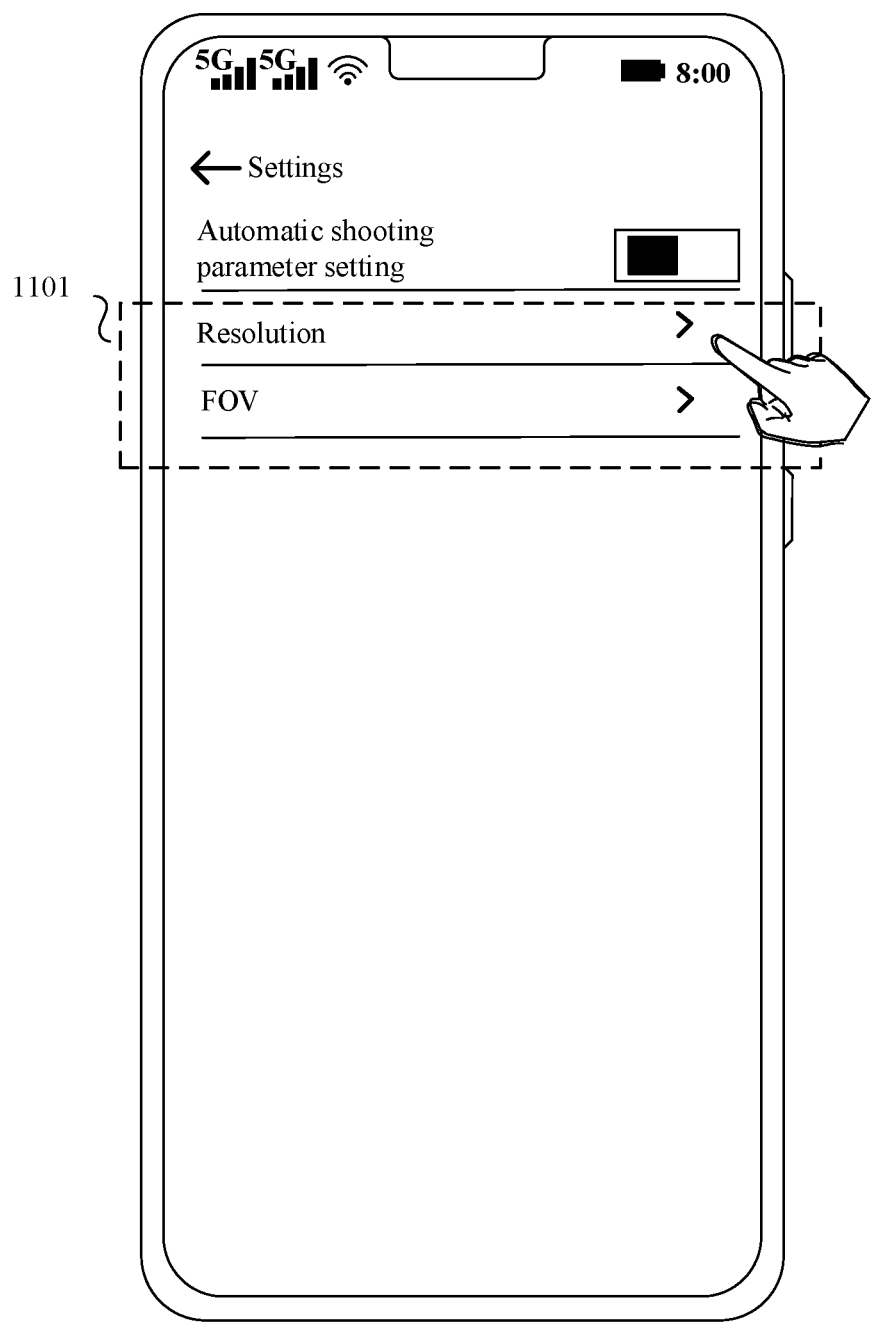
FIG. 11 is a schematic diagram of another setting interface according to an embodiment of this application.
Figure 12:
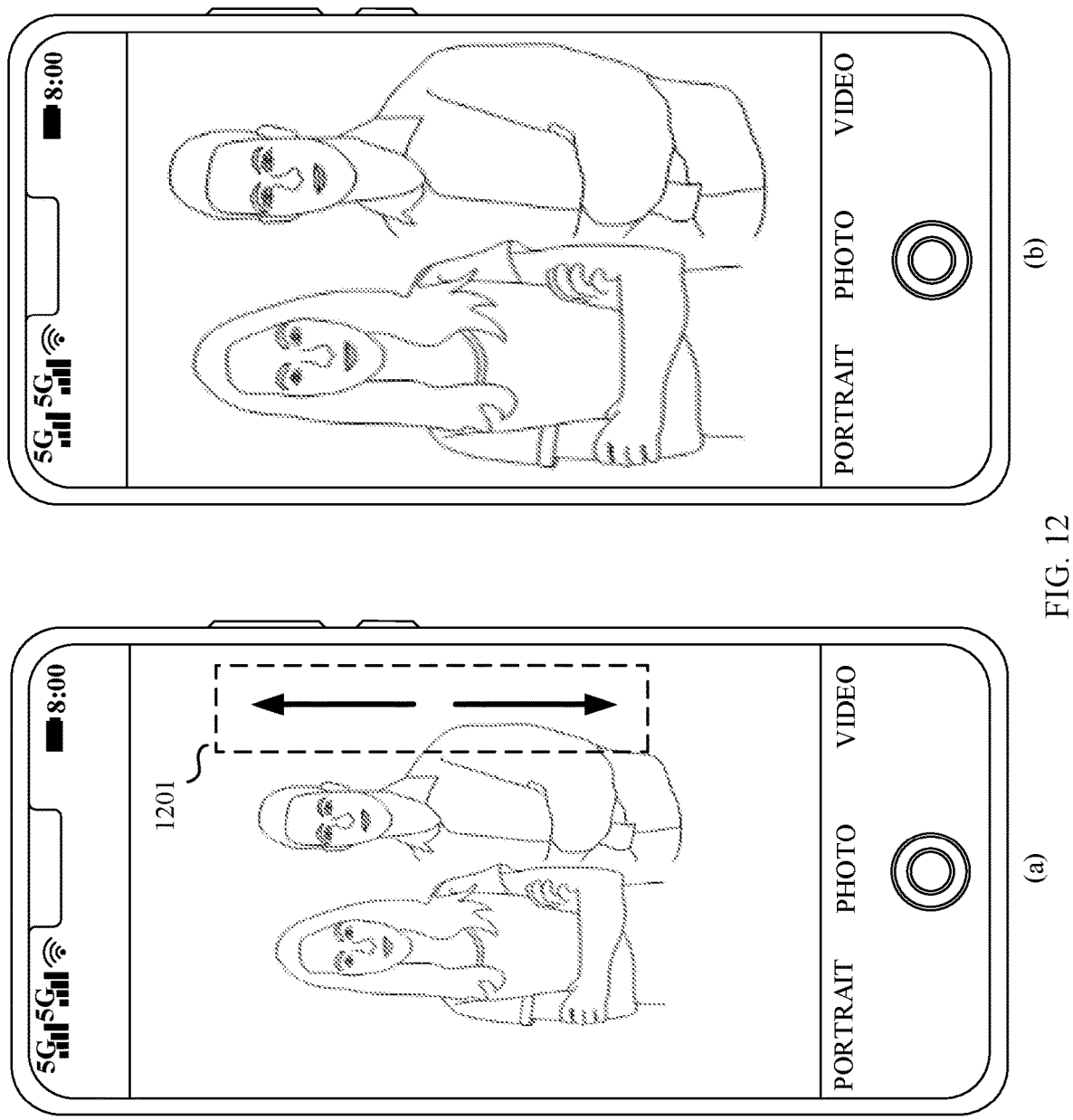
FIG. 12 is a schematic diagram of an interface corresponding to an operation according to an embodiment of this application.

In addition, in some other implementations of this application, according to the foregoing description of FIG. 10(a) to FIG. 10(c), the user may actively set a shooting parameter. For example, in some implementations, a setting interface displayed on the mobile phone may further include content related to shooting parameter setting. For example, buttons for adjusting resolution and an FOV are displayed in 1101 shown in FIG. 11. The user may adjust the resolution to adjust an output image ratio. According to the content displayed in 1101, the user may correspondingly set a desired parameter. After the user sets these shooting parameters, the mobile phone may perform a corresponding operation based on the shooting parameters set by the user in a process of generating a preview image and/or generating a photo. In some other implementations, the user may input a corresponding operation on a preview interface to adjust the shooting parameter. For example, as shown in (a) in FIG. 12, the user may use two fingers to input a zoom-in operation on the preview interface. For example, the user may use two fingers to simultaneously touch the screen and slide in different directions (an operation 1201 shown in (a) in FIG. 12). The mobile phone may display, in response to the operation, an interface shown in (b) in FIG. 12. It can be learned that a size of a shot object in the interface shown in (b) in FIG. 12 is different from a size of the shot object shown in (a) in FIG. 12. In this way, active adjustment of the camera focal length performed by the user can be achieved. It may be understood that, when the focal length of the camera of the mobile phone becomes shorter or longer, the FOV also changes correspondingly. For example, when the focal length is zoomed in, the FOV decreases correspondingly; and when the focal length is zoomed out, the FOV increases correspondingly. In this way, the user can adjust the FOV by performing the foregoing operation.

It should be noted that the solutions provided in this embodiment of this application can provide reference for a user to perform intelligent shooting parameter setting. When the user actively sets the shooting parameter according to the foregoing method or another method, in a process of generating a preview image and/or performing an image processing operation to generate a photo, the mobile phone may perform a corresponding process based on the parameter actively set by the user, to generate a preview image and/or a photo that lives up to an expectation of the user.

To enable a person skilled in the art to understand the solutions provided in this embodiment of this application more clearly, the following uses a scenario in which a user uses a "Camera" APP in a mobile phone to take a photo in a portrait mode as an example to describe the solutions provided in the embodiment of this application in detail.

Figure 13:
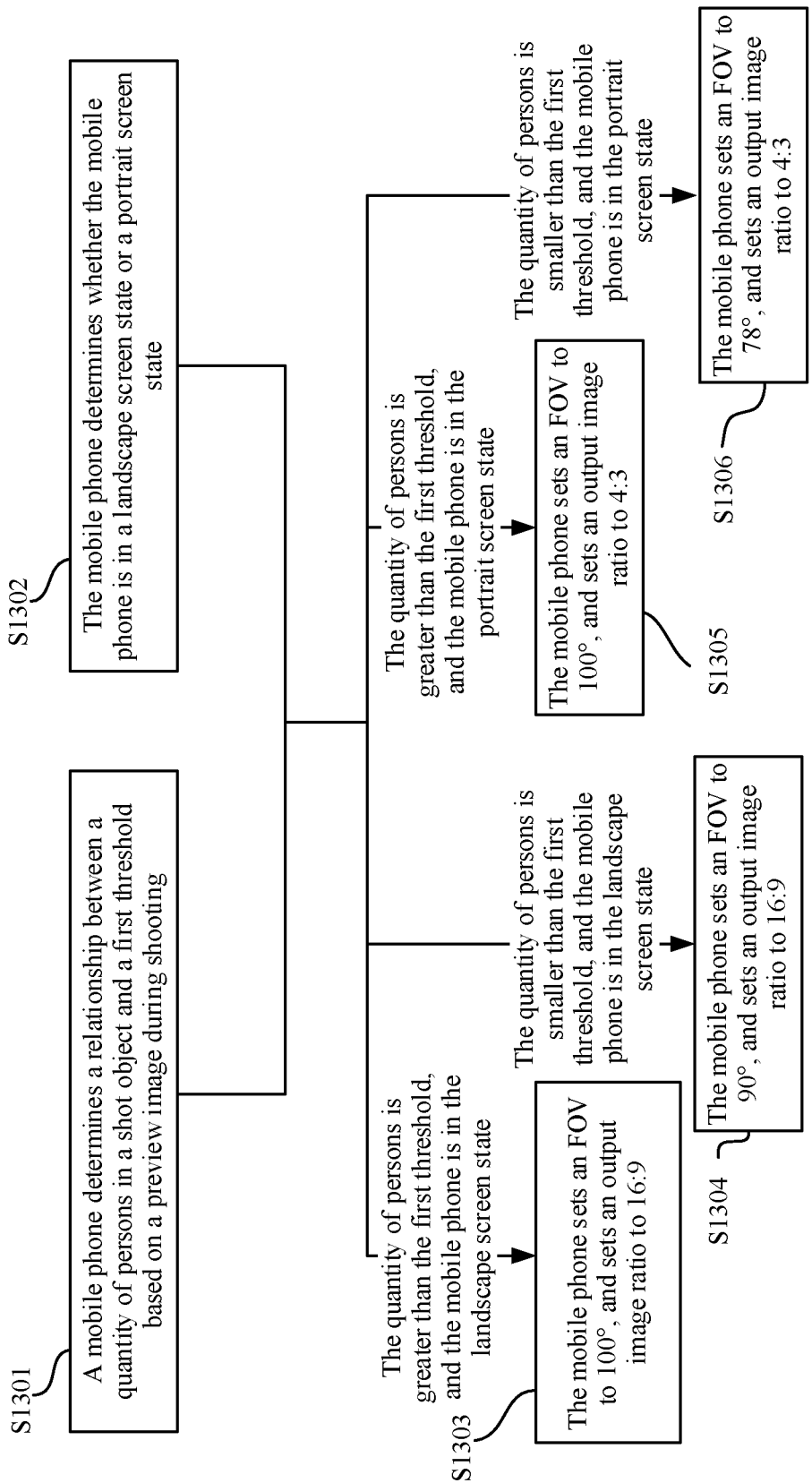
FIG. 13 is a schematic flowchart of another shooting method according to an embodiment of this application.

FIG. 13 is a schematic flowchart of another shooting method according to an embodiment of this application. As shown in FIG. 13, the method may include S1301 to S1306.

S1301: The mobile phone determines a relationship between a quantity of persons in a shot object and a first threshold based on a preview image during shooting.

The first threshold may be an integer greater than or equal to 2.

S1302: The mobile phone determines whether the mobile phone is in a landscape screen state or a portrait screen state.

When the quantity of persons in the shot object is greater than the first threshold, and the mobile phone is in the landscape screen state, the mobile phone performs the following S1303.

When the quantity of persons in the shot object is smaller than the first threshold, and the mobile phone is in the landscape screen state, the mobile phone performs the following S1304.

When the quantity of persons in the shot object is greater than the first threshold, and the mobile phone is in the portrait screen state, the mobile phone performs the following S1305.

When the quantity of persons in the shot object is smaller than the first threshold, and the mobile phone is in the portrait screen state, the mobile phone performs the following S1306.

S1303: The mobile phone sets an FOV to 100°, and sets an output image ratio to be 16:9.

S1304: The mobile phone sets an FOV to 90°, and sets an output image ratio to be 16:9.

S1305: The mobile phone sets an FOV to 100°, and sets an output image ratio to be 4:3.

S1306: The mobile phone sets an FOV to 78°, and sets an output image ratio to be 4:3.

With reference to the foregoing description of the solution shown in FIG. 6, there is no limitation on a sequence of performing S1301 and S1302 in this example. S1301 and S1302 may be performed simultaneously, or may be performed sequentially. This is not limited in this embodiment of this application. It may be understood that, in this example, an example in which the mobile phone sets the FOV and the output image ratio based on the quantity of persons that are photographed and the landscape/portrait screen state is used for description. In some other examples, the mobile phone may further set either or both of the FOV and the output image ratio based on the quantity of persons or the landscape/portrait screen state. For example, when the mobile phone determines that the quantity of persons is greater than the first threshold, the FOV is set to 100°. For another example, when the mobile phone determines that the mobile phone is in the landscape screen state, the mobile phone sets the output image ratio to 16:9. For another example, when the mobile phone determines that the mobile phone is in a portrait screen state, the output image ratio is set to 4:3. In different implementation scenarios, the mobile phone may set different shooting parameters (for example, an FOV and an output image ratio) according to one or more of the foregoing examples, to obtain the better image quality.

With reference to the foregoing descriptions, it should be understood that, when performing shooting, the mobile phone may obtain a preview image based on a default shooting parameter. However, using the default shooting parameter may not bring about a good effect of framing and shooting of a current object. According to the shooting solutions provided in the embodiment of this application, a shooting parameter can be adaptively adjusted based on a quantity of persons in a shot object and a holding manner of a mobile phone, to obtain a better framing and shooting effect.

Figure 14A:
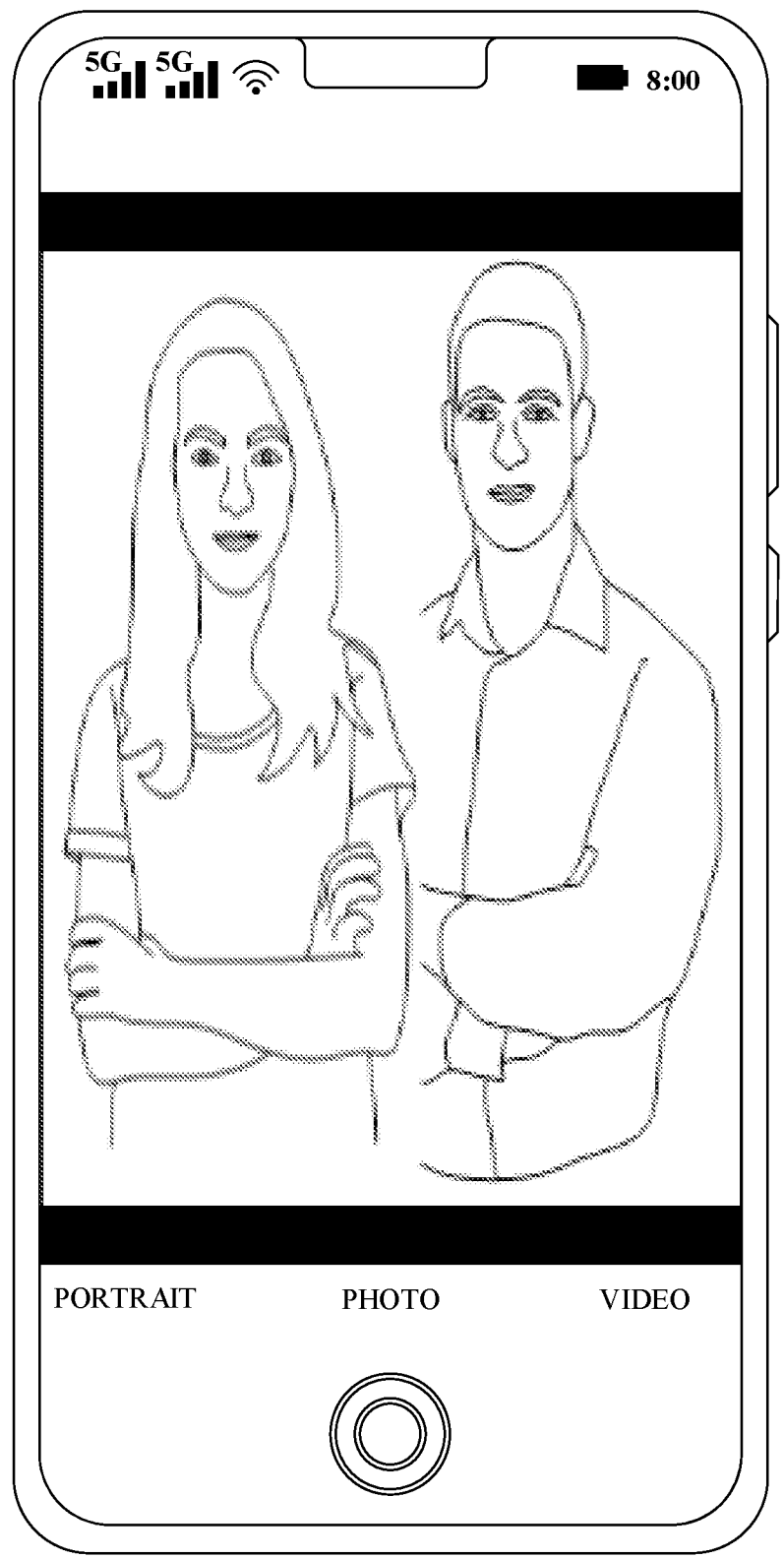
FIG. 14(a) to FIG. 14(c) are schematic diagrams for comparison between shooting interfaces according to an embodiment of this application.
Figure 14B:
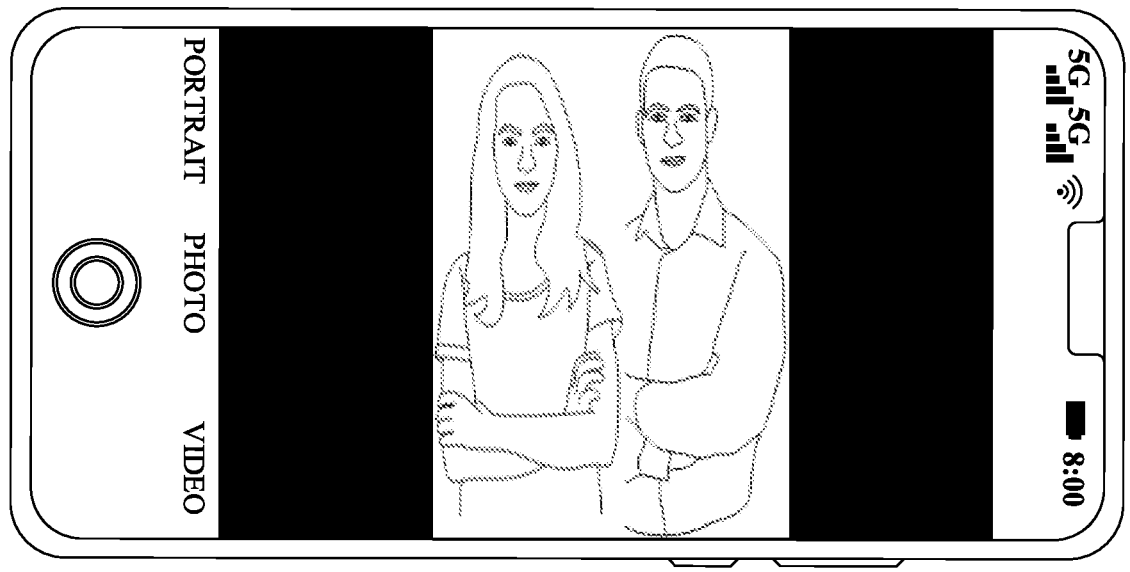
Figure 14C:
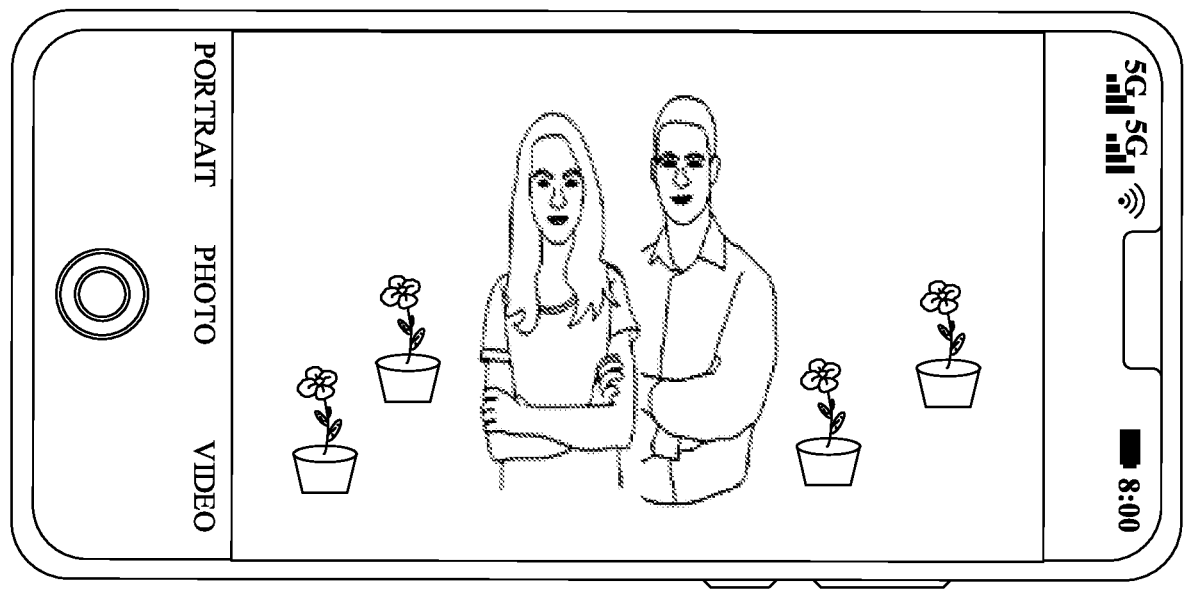

The following describes effects provided in embodiments of this application with reference to examples. For example, an FOV of 780 and an output image ratio of 4:3 are default shooting parameters of the mobile phone. After the user opens the "Camera" APP in the mobile phone, when the mobile phone starts shooting, the mobile phone may obtain a preview image based on the FOV of 780 and the output image ratio of 4:3, and display the preview image on a display screen. A display effect is shown in FIG. 14(*a*). When the user wants to shoot more objects, the user may switch the mobile phone from the portrait screen state to the landscape screen state. In this case, the mobile phone may display a display effect shown in FIG. 14(*b*). According to the solution provided in the embodiment of this application, when the mobile phone determines that the current mobile phone is in the landscape screen state, and the quantity of persons in the preview image is less than the first threshold (for example, the first threshold is set to 3), the mobile phone may display a preview image shown in FIG. 14(*c*) on the display screen. It may be understood that, when determining that the mobile phone is in the landscape screen state and the quantity of persons is less than the first threshold, the mobile phone may adaptively adjust the FOV from 78° to 90°, and adaptively adjust the output image ratio from 4:3 to 16:9. It can be learned that, because the FOV is expanded, the preview image can include more objects. Refer to FIG. 14(*c*). Compared with the preview image in FIG. 14(*b*), after the FOV is expanded, the preview image can include a new object, so that a demand of the user for capturing more objects can be satisfied. In addition, because the output image ratio is adjusted from 4:3 to 16:9, large black edges shown in FIG. 14(*b*) that affect a display effect of the preview image do not appear in the preview image. In addition, it can be learned from comparison between FIG. 14(*b*) and FIG. 14(*c*) that image layout is significantly optimized due to adjustment of the FOV.

Figure 15:
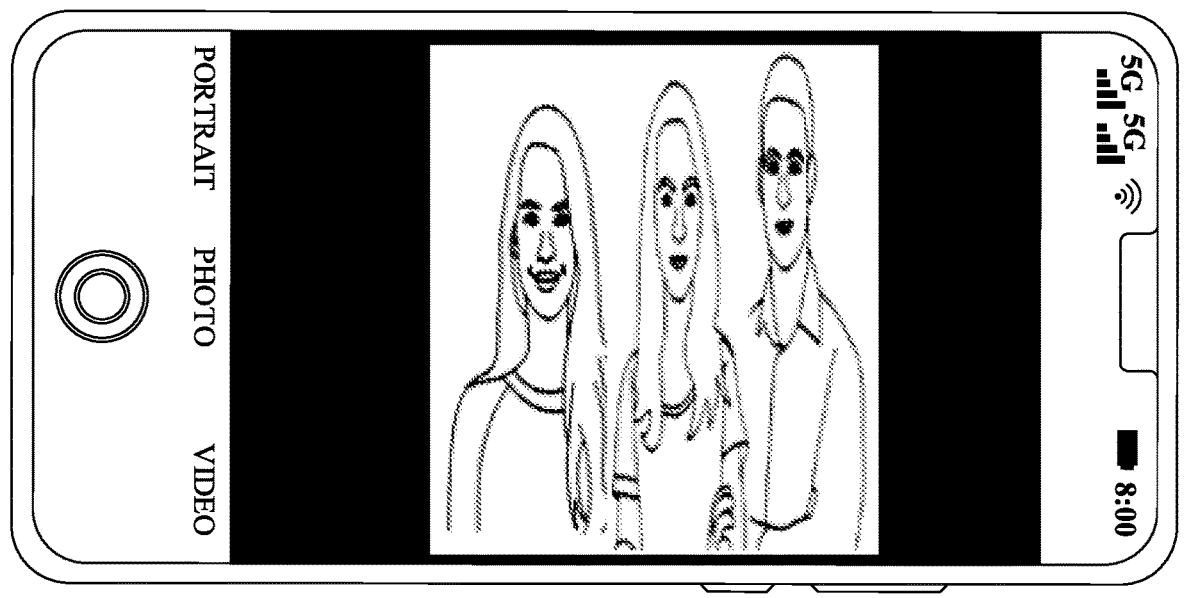
FIG. 15 is another schematic diagram for comparison between shooting interfaces according to an embodiment of this application.
Figure 15:
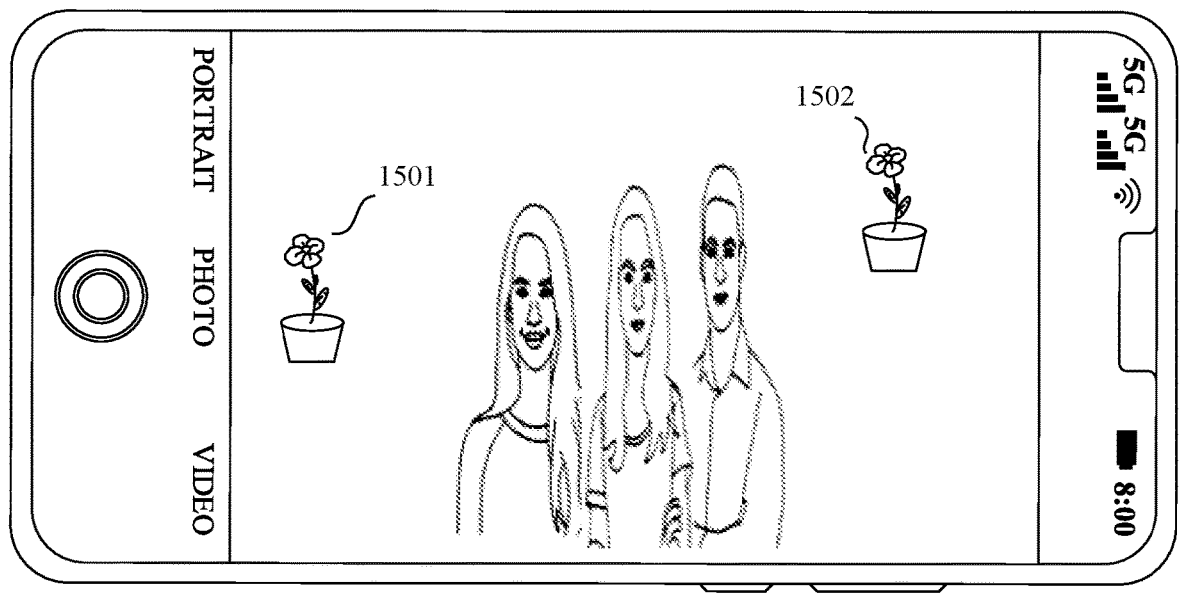

In some other embodiments, the example in which the FOV of 780 and the output image ratio of 4:3 are the default shooting parameters of the mobile phone is still used. Based on the shooting parameters, the preview image may be an image shown in (a) in FIG. 15. It can be learned that the quantity of persons of the shot object is 3. Because the quantity of persons is large, a layout of a photo that is obtained based on the shooting parameters is not appropriate. According to the solutions provided in this embodiment of this application, when determining that the quantity of persons in the current preview image is greater than (or equal to) 3 and the mobile phone is in the landscape screen state, the mobile phone may adjust the FOV to 100° and adjust the output image ratio to 16:9. In this way, the mobile phone may display, on the display screen, a preview image shown in (b) in FIG. 15. It can be learned that, after the FOV is adjusted to 100°, the image can include more objects (for example, a flower 1501 and a flower 1502 shown in (b) in FIG. 15), and the layout of the persons in the image is more appropriate. It is clear that after the shooting parameters are adjusted, the preview image layout is more appropriate. Therefore, a photo with higher quality can be obtained.

The foregoing mainly describes the solutions provided in embodiments of this application from a perspective of the electronic device. To implement the foregoing functions, corresponding hardware structures and/or software modules used to perform the functions are included in the electronic device. A person skilled in the art should easily be aware that, with reference to units and algorithm steps of the examples described in embodiments disclosed in this specification, this application may be implemented by hardware or a combination of hardware and computer software. Whether a function is performed by hardware or hardware driven by computer software depends on a particular application and a design constraint of the technical solution. A person skilled in the art may use different methods to implement the described functions for each particular application, but it should not be considered that the implementation goes beyond the scope of this application.

In embodiments of this application, functional modules of a related device may be divided based on the foregoing method examples. For example, the functional modules may be divided based on various functions, or two or more functions may be integrated into one processing module. The integrated module may be implemented in a form of hardware, or may be implemented in a form of a software functional module. It should be noted that, in embodiments of this application, module division is an example, and is merely logical function division. In actual implementation, another division manner may be used.

Figure 16:
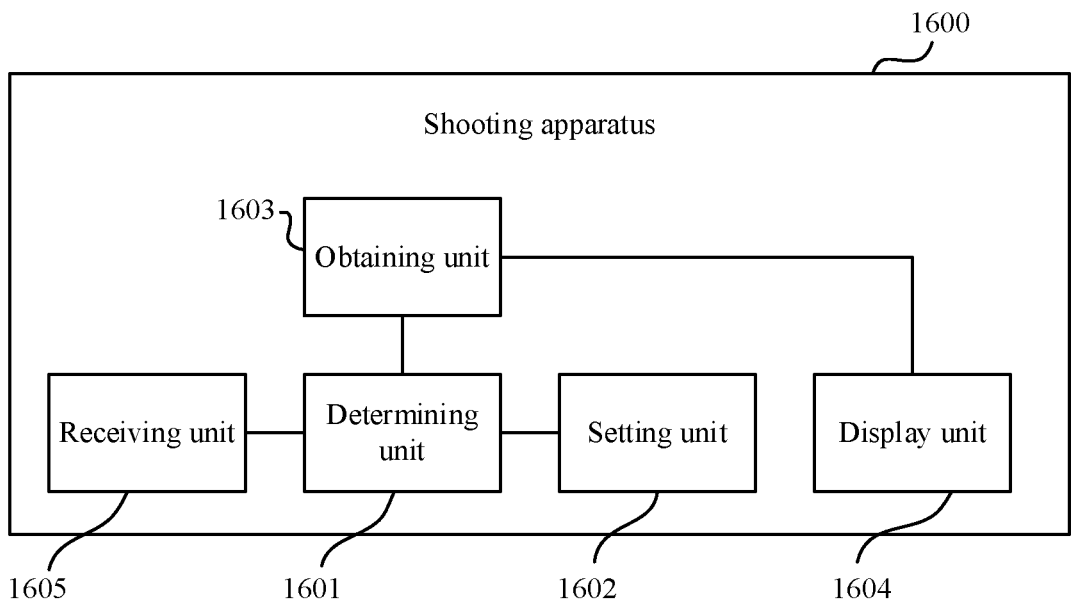
FIG. 16 is a schematic diagram of composition of a shooting apparatus according to an embodiment of this application.

FIG. 16 is a schematic diagram of composition of a shooting apparatus 1600 according to an embodiment of this application. The solutions provided in embodiments of this application can be applied to the shooting apparatus 1600. As shown in FIG. 16, the shooting apparatus 1600 may include a determining unit 1601, a setting unit 1602, an obtaining unit 1603, and a display unit 1604. It should be noted that, with reference to FIG. 4, the shooting apparatus 1600 in FIG. 16 may be disposed in the electronic device 400, or may be another term for the electronic device 400. A function of each unit may be implemented by a hardware component in the electronic device 400.

The determining unit 1601 is configured to determine a quantity of shot objects and/or a holding state when shooting is started, where the holding state includes a first state in which a display screen is a landscape screen or a second state in which the display screen is a portrait screen. The setting unit 1602 is configured to set a shooting parameter based on the determined quantity of the shot objects and/or the determined holding state, where the shooting parameter is a parameter used when the electronic device performs shooting. The obtaining unit 1603 is configured to obtain a first preview image based on the shooting parameter. The display unit 1604 is configured to display the first preview image.

In a possible design, the obtaining unit 1603 is further configured to obtain a second preview image based on a current shooting parameter. The determining unit 1601 is configured to determine the quantity of the shot objects and/or the holding state based on the second preview image.

In a possible design, when the holding state is the first state, the setting unit 1602 is configured to set an output image ratio to a first output image ratio. When the holding state is the second state, the setting unit 1602 is configured to set the output image ratio to a second output image ratio.

In a possible design, the first output image ratio is 16:9, and the second output image ratio is 4:3.

In a possible design, the determining unit 1601 is configured to determine that the quantity of the shot objects is greater than a first threshold, and the setting unit 1602 is configured to set an FOV to a first FOV. The determining unit 1601 is configured to determine that the quantity of the shot objects is less than the first threshold, and that the holding state is the first state. The setting unit 1602 is configured to set an FOV to a second FOV. The determining unit 1601 is configured to determine that the quantity of the shot objects is less than the first threshold, and that the holding state is the second state. The setting unit 1602 is configured to set an FOV to a third FOV. The first FOV is greater than the second FOV, and the second FOV is greater than the third FOV.

In a possible design, the first FOV is 100 degrees, the second FOV is 90 degrees, and the third FOV is 78 degrees.

In a possible design, the electronic device is provided with a first camera module and a second camera module, and a maximum FOV of the second camera module is greater than a maximum FOV of the first camera module. When the electronic device sets the FOV to the first FOV, and the first FOV is greater than the maximum FOV of the first camera module, the electronic device performs shooting by using the second camera module. Alternatively, when the electronic device sets the FOV to the second FOV, and the second FOV is greater than the maximum FOV of the first camera module, the electronic device performs shooting by using the second camera module.

In a possible design, before the electronic device obtains the first preview image based on the shooting parameter, the display unit 1604 is configured to display the second preview image obtained based on the current shooting parameter. The display unit 1604 is further configured to switch from displaying the second preview image to displaying the first preview image.

In a possible design, the apparatus further includes a receiving unit 1605, configured to receive a first operation of a user before shooting is started, where the first operation is used to indicate the electronic device to start shooting.

In a possible design, the receiving unit 1605 is configured to receive a second operation of the user, where the second operation is used to indicate the electronic device to photograph a currently displayed preview image; and in response to the second operation, the setting unit 1602 is configured for the electronic device to perform image processing on the preview image based on a set shooting image, to obtain a corresponding photo and store the photo.

It should be noted that all related content of the steps in the foregoing method embodiments may be cited in function descriptions of corresponding functional modules. Details are not described herein again.

Figure 17:
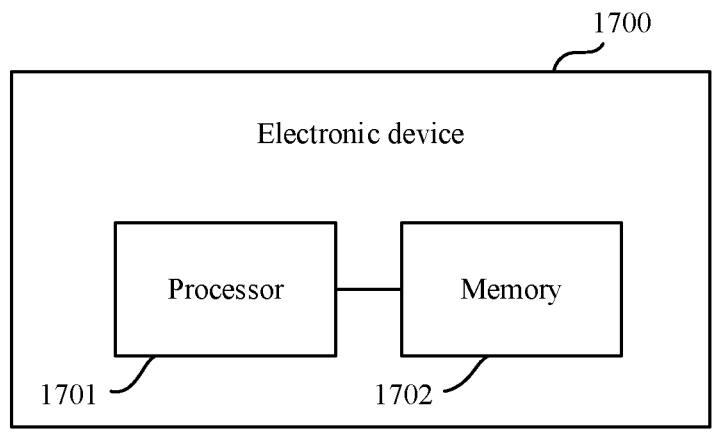
FIG. 17 is a schematic diagram of composition of an electronic device according to an embodiment of this application.

FIG. 17 shows a schematic diagram of composition of an electronic device 1700. As shown in FIG. 17, the electronic device 1700 may include a processor 1701 and a memory 1702. The memory 1702 is configured to store computer-executable instructions. For example, in some embodiments, when the processor 1701 executes the instructions stored in the memory 1702, the electronic device 1700 may perform the shooting method shown in any one of the foregoing embodiments.

It should be noted that all related content of the steps in the foregoing method embodiments may be cited in function descriptions of corresponding functional modules. Details are not described herein again.

Figure 18:
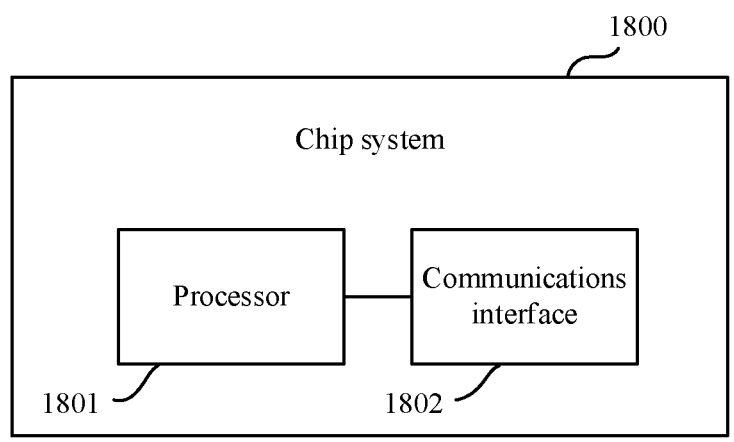
FIG. 18 is a schematic diagram of composition of a chip system according to an embodiment of this application.

FIG. 18 shows a schematic diagram of composition of a chip system 1800. The chip system 1800 may include a processor 1801 and a communications interface 1802, configured to support a related device in implementing the functions in the foregoing embodiments. In a possible design, the chip system further includes a memory. The memory is configured to store program instructions and data that are necessary for the terminal. The chip system may include a chip, or may include a chip and another discrete device. It should be noted that, in some implementations of this application, the communications interface 1802 may also be referred to as an interface circuit.

It should be noted that all related content of the steps in the foregoing method embodiments may be cited in function descriptions of corresponding functional modules. Details are not described herein again.

All or a part of functions, actions, operations, steps, and the like in the foregoing embodiments may be implemented by using software, hardware, firmware, or any combination thereof. When a software program is used for implementation, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, through a coaxial cable, an optical fiber, or a digital subscriber line (digital subscriber line, DSL)) or a wireless manner (for example, through infrared, radio, or microwave). The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk (solid state disk, SSD)), or the like.

Although this application is described with reference to specific features and embodiments thereof, it is clear that various modifications and combinations may be made without departing from the spirit and scope of this application. Correspondingly, the specification and accompanying drawings are merely examples of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and equivalent technologies.

The invention claimed is:

1. A method, comprising:
    determining, by an electronic device having a shooting function, a quantity of shot objects that can be clearly imaged and a holding state when shooting is started, wherein the holding state comprises a first state in which a display screen of the electronic device is a landscape screen or a second state in which the display screen is a portrait screen;
    setting, by the electronic device, at least one shooting parameter based on the quantity of the shot objects and the holding state using a relationship rule,
    wherein the at least one shooting parameter is used when the electronic device performs the shooting, wherein the relationship rule maps a first quantity of shot objects and the first state to at least a first shooting parameter,
wherein the relationship rule maps a second quantity of shot objects and the first state to at least a second shooting parameter,
wherein the relationship rule maps the first quantity of shot objects and the second state to at least a third shooting parameter,
wherein the relationship rule maps the second quantity of shot objects and the second state to at least a fourth shooting parameter,
wherein the first quantity and the second quantity are different from each other, and
wherein the first shooting parameter, the second shooting parameter, the third shooting parameter, and the fourth shooting parameter are different from one another;
obtaining, by the electronic device, a first preview image based on the at least one shooting parameter; and
displaying, by the electronic device, the first preview image on the display screen.

2. The method according to claim 1, wherein the method further comprises:
before the determining:
obtaining, by the electronic device, a second preview image based on a current shooting parameter, and
wherein the determining, by the electronic device, the at least one of the quantity of the shot objects or the holding state comprises:
determining, by the electronic device, the at least one of the quantity of the shot objects or the holding state based on the second preview image.

3. The method according to claim 1, wherein the electronic device determines the holding state, and the at least one shooting parameter comprises an output image ratio, and wherein the setting, by the electronic device, the at least one shooting parameter comprises:
based on that the holding state is the first state, setting, by the electronic device, the output image ratio to a first output image ratio; or
based on that the holding state is the second state, setting, by the electronic device, the output image ratio to a second output image ratio.

4. The method according to claim 3, wherein the first output image ratio is 16:9, and wherein the second output image ratio is 4:3.

5. The method according to claim 3, wherein the electronic device further determines the quantity of the shot objects, the at least one shooting parameter further comprises a field of view (FOV), and the setting, by the electronic device, the at least one shooting parameter comprises:
determining, by the electronic device, that the quantity of the shot objects is greater than a first threshold, and setting the FOV to a first FOV; or
determining, by the electronic device, that the quantity of the shot objects is less than the first threshold and that the holding state is the first state, and setting the FOV to a second FOV; or
determining, by the electronic device, that the quantity of the shot objects is less than the first threshold and that the holding state is the second state, and setting the FOV to a third FOV,
wherein the first FOV is greater than the second FOV, and the second FOV is greater than the third FOV.

6. The method according to claim 5, wherein the first FOV is 100 degrees, the second FOV is 90 degrees, and the third FOV is 78 degrees.

7. The method according to claim 5,
wherein the electronic device is provided with a first camera and a second camera, and a second maximum FOV of the second camera is greater than a first maximum FOV of the first camera, and
wherein, based on that the electronic device sets the FOV to the first FOV, and the first FOV is greater than the first maximum FOV of the first camera, the electronic device performs the shooting by using the second camera, or
wherein, based on that the electronic device sets the FOV to the second FOV, and the second FOV is greater than the first maximum FOV of the first camera, the electronic device performs the shooting by using the second camera.

8. The method according to claim 1, wherein the method further comprises:
before the obtaining, by the electronic device, the first preview image based on the at least one shooting parameter:
displaying, by the electronic device, a second preview image obtained based on a current shooting parameter on the display screen, and
wherein the displaying, by the electronic device, the first preview image on the display screen comprises:
controlling, by the electronic device, the display screen to switch from displaying the second preview image to displaying the first preview image.

9. The method according to claim 1, wherein the method further comprises:
before the shooting is started:
receiving, by the electronic device, a first operation of a user, wherein the first operation indicates to the electronic device to start the shooting.

10. The method according to claim 1, wherein the method further comprises:
receiving, by the electronic device, a second operation of a user, wherein the second operation indicates to the electronic device to photograph a currently displayed preview image; and
performing, by the electronic device in response to the second operation, image processing on the currently displayed preview image based on a set shooting image to obtain a corresponding photo and store the corresponding photo.

11. An electronic device, comprising:
a display screen;
one or more processors; and
one or more memories, wherein the one or more memories are coupled to the one or more processors, and the one or more memories store computer instructions,
wherein the electronic device has a shooting function, and
wherein the one or more processors execute the computer instructions to cause the electronic device to perform operations including:
determining at least one of a quantity of shot objects that can be clearly imaged and a holding state when shooting is started, wherein the holding state comprises a first state in which the display screen is a landscape screen or a second state in which the display screen is a portrait screen;
setting at least one shooting parameter based on the quantity of the shot objects and the holding state using a relationship rule, wherein the at least one shooting parameter is used when the electronic device performs the shooting,
wherein the relationship rule maps a first quantity of shot objects and the first state to at least a first shooting parameter,
wherein the relationship rule maps a second quantity of shot objects and the first state to at least a second shooting parameter,
wherein the relationship rule maps the first quantity of shot objects and the second state to at least a third shooting parameter,
wherein the relationship rule maps the second quantity of shot objects and the second state to at least a fourth shooting parameter,
wherein the first quantity and the second quantity are different from each other, and
wherein the first shooting parameter, the second shooting parameter, the third shooting parameter, and the fourth shooting parameter are different from one another;
obtaining a first preview image based on the at least one shooting parameter; and
displaying the first preview image on the display screen.

12. The electronic device according to claim 11, the operations further comprising:
before the determining:
obtaining a second preview image based on a current shooting parameter, and
wherein the determining the at least one of the quantity of the shot objects or the holding state comprises:
determining the at least one of the quantity of the shot objects or the holding state based on the second preview image.

13. The electronic device according to claim 11, wherein the at least one shooting parameter comprises an output image ratio, and wherein the setting, by the electronic device, the at least one shooting parameter comprises:
based on that the holding state is the first state, setting the output image ratio to a first output image ratio; or
based on that the holding state is the second state, setting the output image ratio to a second output image ratio.

14. The electronic device according to claim 13, wherein the first output image ratio is 16:9, and wherein the second output image ratio is 4:3.

15. The electronic device according to claim 11, wherein the electronic device further determines the quantity of the shot objects, the at least one shooting parameter further comprises a field of view (FOV), and the setting the at least one shooting parameter comprises:
determining that the quantity of the shot objects is greater than a first threshold, and setting the FOV to a first FOV; or
determining that the quantity of the shot objects is less than the first threshold and that the holding state is the first state, and setting the FOV to a second FOV; or
determining that the quantity of the shot objects is less than the first threshold and that the holding state is the second state, and setting the FOV to a third FOV,
wherein the first FOV is greater than the second FOV, and the second FOV is greater than the third FOV.

16. A non-transitory computer-readable storage medium, wherein the non-transitory computer-readable storage medium stores computer instructions that, when executed by an electronic device having a shooting function, cause the electronic device to perform operations, the operations comprising:
determining at least one of a quantity of shot objects that can be clearly imaged and a holding state when shooting is started, wherein the holding state comprises a first state in which a display screen of the electronic device is a landscape screen or a second state in which the display screen is a portrait screen;
setting at least one shooting parameter based on the quantity of the shot objects and the holding state using a relationship rule, wherein the at least one shooting parameter is used when the electronic device performs the shooting,
wherein the relationship rule maps a first quantity of shot objects and the first state to at least a first shooting parameter,
wherein the relationship rule maps a second quantity of shot objects and the first state to at least a second shooting parameter,
wherein the relationship rule maps the first quantity of shot objects and the second state to at least a third shooting parameter,
wherein the relationship rule maps the second quantity of shot objects and the second state to at least a fourth shooting parameter,
wherein the first quantity and the second quantity are different from each other, and
wherein the first shooting parameter, the second shooting parameter, the third shooting parameter, and the fourth shooting parameter are different from one another;
obtaining a first preview image based on the at least one shooting parameter; and
displaying the first preview image on the display screen.

17. The non-transitory computer-readable storage medium according to claim 16, the operations further comprising:
before the determining:
obtaining a second preview image based on a current shooting parameter, and
wherein the determining the at least one of the quantity of the shot objects or the holding state comprises:
determining the at least one of the quantity of the shot objects or the holding state based on the second preview image.

18. The non-transitory computer-readable storage medium according to claim 16, wherein the at least one shooting parameter comprises an output image ratio, and wherein the setting, by the electronic device, the at least one shooting parameter comprises:
based on that the holding state is the first state, setting the output image ratio to a first output image ratio; or
based on that the holding state is the second state, setting the output image ratio to a second output image ratio.

19. The non-transitory computer-readable storage medium according to claim 18, wherein the first output image ratio is 16:9, and wherein the second output image ratio is 4:3.

20. The non-transitory computer-readable storage medium according to claim 16, wherein the electronic device further determines the quantity of the shot objects, the at least one shooting parameter further comprises a field of view (FOV), and the setting the at least one shooting parameter comprises:
determining that the quantity of the shot objects is greater than a first threshold, and setting the FOV to a first FOV; or
determining that the quantity of the shot objects is less than the first threshold and that the holding state is the first state, and setting the FOV to a second FOV; or determining that the quantity of the shot objects is less than the first threshold and that the holding state is the second state, and setting the FOV to a third FOV, wherein the first FOV is greater than the second FOV, and the second FOV is greater than the third FOV.

* * * * *